United States Patent
Lee et al.

(10) Patent No.: US 12,271,468 B2
(45) Date of Patent: Apr. 8, 2025

(54) DISPLAY APPARATUS AND OPERATION METHOD THEREOF

(71) Applicant: SAMSUNG ELECTRONICS CO., LTD., Suwon-si (KR)

(72) Inventors: Jongin Lee, Suwon-si (KR); Sunwoong Joo, Suwon-si (KR); Jeongsik Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 18/093,111

(22) Filed: Jan. 4, 2023

(65) Prior Publication Data

US 2023/0153419 A1    May 18, 2023

Related U.S. Application Data

(63) Continuation of application No. PCT/KR2022/017797, filed on Nov. 11, 2022.

(30) Foreign Application Priority Data

Nov. 12, 2021  (KR) .......................... 10-2021-0156053

(51) Int. Cl.
*G06F 21/53*    (2013.01)
*G06F 21/60*    (2013.01)
*G06F 21/62*    (2013.01)

(52) U.S. Cl.
CPC ............ *G06F 21/53* (2013.01); *G06F 21/602* (2013.01); *G06F 21/6245* (2013.01)

(58) Field of Classification Search
CPC ...... G06F 21/53; G06F 21/602; G06F 21/6245
See application file for complete search history.

(56) References Cited

U.S. PATENT DOCUMENTS

| 11,062,121 | B2* | 7/2021 | Croxford | ............... | G06N 3/045 |
| 11,170,204 | B2 | 11/2021 | Guo et al. | | |
| 11,443,034 | B2* | 9/2022 | Li | ............... | G06F 21/57 |

(Continued)

FOREIGN PATENT DOCUMENTS

| CN | 107315970 | 11/2017 |
| CN | 111260053 | 6/2020 |

(Continued)

OTHER PUBLICATIONS

Malchi SK, Kallam S, Al-Turjman F, Patan R. A trust-based fuzzy neural network for smart data fusion in internet of things. Computers & Electrical Engineering. Jan. 1, 2021;89:106901 (Year: 2021).*

(Continued)

*Primary Examiner* — Syed A Zaidi
(74) *Attorney, Agent, or Firm* — Nixon & Vanderhye P.C.

(57) ABSTRACT

A display apparatus with increased security performance, for using the resources of a restricted secure world (SW), and/or an operation method thereof. The display apparatus may include a display, and a controller including at least one processor configured to perform one or more instructions to separately run a normal operating system (OS) and a secure OS, which are respectively executed in a normal world (NWD) and an SWD corresponding to a TrustZone.

19 Claims, 20 Drawing Sheets

(56) References Cited

U.S. PATENT DOCUMENTS

| | | | | |
|---|---|---|---|---|
| 2013/0145475 | A1* | 6/2013 | Ryu | G06F 21/31 |
| | | | | 726/26 |
| 2019/0392194 | A1* | 12/2019 | Croxford | G06N 3/04 |
| 2019/0392305 | A1 | 12/2019 | Gu et al. | |
| 2020/0311546 | A1 | 10/2020 | Lee et al. | |
| 2021/0049449 | A1 | 2/2021 | Tai et al. | |
| 2021/0133577 | A1* | 5/2021 | Srinivasan | G06N 20/00 |
| 2022/0198562 | A1* | 6/2022 | Cella | G06Q 40/04 |
| 2022/0269942 | A1* | 8/2022 | Gu | G06F 21/602 |
| 2022/0283958 | A1* | 9/2022 | Lidman | G06F 12/1458 |
| 2022/0405430 | A1 | 12/2022 | Huh et al. | |

FOREIGN PATENT DOCUMENTS

| | | |
|---|---|---|
| CN | 111310208 | 6/2020 |
| KR | 10-2020-0000361 A | 1/2020 |
| KR | 10-2147912 B1 | 8/2020 |
| KR | 10-2020-0113744 | 10/2020 |
| KR | 10-2021-0107288 A | 9/2021 |
| KR | 10-2021-0133471 A | 11/2021 |
| WO | WO 2020/242689 A1 | 12/2020 |
| WO | WO 2021/172749 A1 | 9/2021 |

OTHER PUBLICATIONS

Awan, Kamran Ahmad, et al. "Neuro Trust-Artificial-neural-network-based intelligent trust management mechanism for large-scale Internet of Medical Things." IEEE Internet of Things Journal 8.21 (2020): 15672-15682 (Year: 2020).*
NPL Search Terms (Year: 2024).*
PCT International Search Report dated Feb. 16, 2023 for PCT/KR2022/017797.
Park et al., Training Deep Neural Network in Limited Precision, Oct. 12, 2018; pp. 10-12.
Online—Course Website, CS231n Convolutional Neural Networks for Visual Recognition, 23 pages.
Neurohive, "VGG16—Convolutional Network for Classification and Detection", Nov. 20, 2018, 7 pages.
Felton, "What is a Trusted Execution Environment (TEE)?", Trustonic, Jul. 5, 2019, 15 pages.
Extended European Search Report dated Nov. 5, 2024 for EP Application No. 22893285.1.
Sun et al., "ShadowNet: A Secure and Efficient System for On-device Model Inference" XP081976513, Jun. 14, 2021; 29 pages.

* cited by examiner

DISPLAY APPARATUS AND OPERATION METHOD THEREOF

CROSS-REFERENCE TO RELATED APPLICATIONS

This application is a continuation of International Application No. PCT/KR2022/017797, filed on Nov. 11, 2022, designating the United States, and claiming priority to KR 10-2021-0156053, filed Nov. 12, 2021, the disclosures of which are all hereby incorporated by reference herein in their entireties.

BACKGROUND

Field

Certain example embodiments may relate to a display apparatus having installed thereon an operating system (OS) that operates in a secure world (SWD) corresponding to a TrustZone, and/or an operation method of the display apparatus.

Description of Related Art

Electronic devices, such as computers, smartphones, tablet personal computers (PCs), and personal digital assistants (PDAs), are used in close connection with users. As electronic devices that are personally used by users are widely used, the amount of personal information of a user or user-related information input to or stored in an electronic device has increased.

In addition, as users perform various tasks through electronic devices or server devices, the number of cases in which personal information of users or user-related information must be input to electronic devices or server devices has also increased.

Hereinafter, an electronic device or a server device that performs a certain task or a certain operation will be referred to as a 'computing device'. When personal information of a user or user-related information is input to or stored in a computing device, it is important to protect the user's personal information or user-related information from hacking.

Thus, security technologies for protecting users' personal information or user-related information from hacking have been developed.

A security method using a TrustZone is an example of such security technologies.

In the TrustZone, which is a hardware security technology, hardware such as memory is divided into a secure world (SWD) corresponding to the trustzone and a normal world (NWD), and the NWD is set to be unable to access the resources of the SWD, thereby protecting data received through the SWD and stored in the SWD. In other words, electronic devices may have increased security performance by processing data requiring security processing in the SWD.

The SWD included in an electronic device has a significant limitation in operating performance. For example, in order to establish an SWD in an electronic device, the electronic device needs to have separate hardware resources (e.g., a central processing unit (CPU) and memory) operating in the SWD. Accordingly, there is a problem in that additional manufacturing costs for separate hardware resources (e.g., a CPU and memory) are required, leading to an increase in the manufacturing costs of the electronic device. Therefore, in general, electronic devices are provided by limiting the hardware resources forming an SWD according to a certain limit.

For example, a company's digital TVs use only one CPU core in order to establish an SWD and also use a maximum memory specification limited to several tens of mega bites (MB) or less. In addition, in order to establish an SWD in an electronic device, a driver for each hardware chipset (H/W chipset) operating in the SWD must be developed. For example, a driver applied to an SWD is different from a driver applied to an NWD, and separate development is inevitable.

Moreover, the memory capacity of the SWD is very small compared to that of the NWD. Accordingly, the SWD has limited capacity of storable resources compared to the NWD, and also is limited in the amount and speed of work that can be processed. Furthermore, when a certain operation is performed in the SWD, the SWD lacks programs, tools, and/or resources that are helpful in performing the certain operation, and thus has a low processing speed compared with a case when the certain operation is performed in the NWD.

SUMMARY

Therefore, an apparatus and method for overcoming the above-mentioned problems to increase the security performance and achieve a desired security maintenance while using limited SWD resources without increasing the SWD resources are required.

In an example embodiment, there may be provided a display apparatus with improved security performance while using the resources of a secure world (SWD), and/or an operation method of the display apparatus.

For example, there may be provided a display apparatus capable of reducing the use of the resources of an SWD necessary for performing a calculation through a neural network and also increasing security performance, when input data is input to and processed by the neural network, and/or an operation method of the display apparatus.

According to an example embodiment, a display apparatus may include a display, a data obtainer configured to obtain input data, and a controller including at least one processor, comprising processing circuitry, configured to perform one or more instructions to separately run a normal operating system (OS) and a secure OS, which are respectively executed in a normal world (NWD) and a secure world (SWD) corresponding to a TrustZone. The processor may be configured to, upon execution of the one or more instructions, identify whether the input data input to a deep neural network (DNN) including a plurality of hidden layers between an input layer and an output layer corresponds to security data, based on identifying that the input data corresponds to the security data, control the secure OS so that layers from the input layer of the DNN to at least one hidden layer connected to the input layer are driven within the SWD, and, based on identifying that the input data does not correspond to security data, control the normal OS so that the entire DNN is driven in a world other than the SWD.

Based on the input data corresponding to at least one of user input data, content protection data, or personal information of a user, the processor may identify that the input data corresponds to the security data. "Based on" herein covers based at least on.

Based on the input data being identified as corresponding to security data, the processor may differently set a depth of the at least one hidden layer driven in the SWD, based on at least one of the type or characteristics of the input data.

Based on the input data being identified as corresponding to security data, the processor may differently set the depth of the at least one hidden layer, based on a security level that is applied to the input data.

Based on first input data to which digital rights management (DRM) encryption has not been applied and second input data to which DRM encryption has been applied corresponding to a first security level and a second security level, respectively, the processor may be configured to control the depth of the at least one hidden layer driven in the SWD to be a first depth, in the DNN receiving the first input data to which DRM encryption has not been applied, and may control the depth of the at least one hidden layer driven in the SWD to be a second depth higher than the first depth, in the DNN receiving the second input data to which DRM encryption has been applied.

The DNN may be formed as a convolution neural network (CNN) including a plurality of hidden layers. Based on identifying that the input data corresponds to security data, the at least one processor may control the secure OS so that layers from the input layer to at least one hidden layer connected to the input layer from among the plurality of hidden layers included in the CNN are driven within the SWD, and/or may control a calculation corresponding to one hidden layer performing a convolution operation for obtaining a feature map to be performed in the SWD at least once.

The processor may set the depth of the at least one hidden layer driven in the SWD, based on a deformation degree between each of a plurality of intermediate products respectively output by the plurality of hidden layers and the input data.

The processor may set the depth of the at least one hidden layer driven in the SWD, based on a deformation degree increase rate between the plurality of intermediate products respectively output by the plurality of hidden layers.

The processor may train the DNN so that a deformation degree between an intermediate product output by the at least one hidden layer driven in the SWD and the input data increases.

Based on identifying that the input data corresponds to the security data, the processor may control the normal OS so that layers from a subsequent hidden layer subsequently connected to the at least one hidden layer of the DNN to the output layer are driven within the NWD.

Based on identifying that the input data does not correspond to security data, the processor may control the normal OS so that the entire DNN is driven in the NWD.

Based on identifying that the input data does not correspond to security data, the processor may control the communication interface so that the input data is transmitted to the external device so that the entire DNN is driven in the NWD.

According to an example embodiment, an operation method of a display apparatus including at least one processor configured to separately run a normal operating system (OS) and a secure OS, which are respectively executed in a normal world (NWD) and a secure world (SWD) corresponding to a trustzone, may include identifying whether input data input to a deep neural network (DNN) including a plurality of hidden layers between an input layer and an output layer corresponds to security data; based on identifying that the input data corresponds to security data, controlling the secure OS so that layers from the input layer to at least one hidden layer connected to the input layer from among the plurality of hidden layers included in the DNN are driven within the SWD; and, based on identifying that the input data does not correspond to security data, controlling the normal OS so that the entire DNN is driven in a world other than the SWD.

A display apparatus and an operation method thereof, according to an example embodiment, may increase security performance while using the resources of a secure world (SWD).

In detail, in the display apparatus and the operation method thereof, according to an example embodiment, when input data is input to a neural network and processed, use of the resources of an SWD for performing an arithmetic operation through a neural network may be reduced, and/or security performance may be increased.

For example, in the display apparatus and the operation method thereof, according to an example embodiment, when the input data is input to the neural network and processed, security for input data that is processed may be maintained without performing all arithmetic operations that are performed in a neural network.

Moreover, in the display apparatus and the operation method thereof, according to an example embodiment, when input data is input to a neural network and processed, the depth of a deep neural network that is separated and driven within an SWD may be set differently, based on security necessity or a security level of the input data. Thus, security performance may be increased in correspondence with the security necessity of the input data.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1:
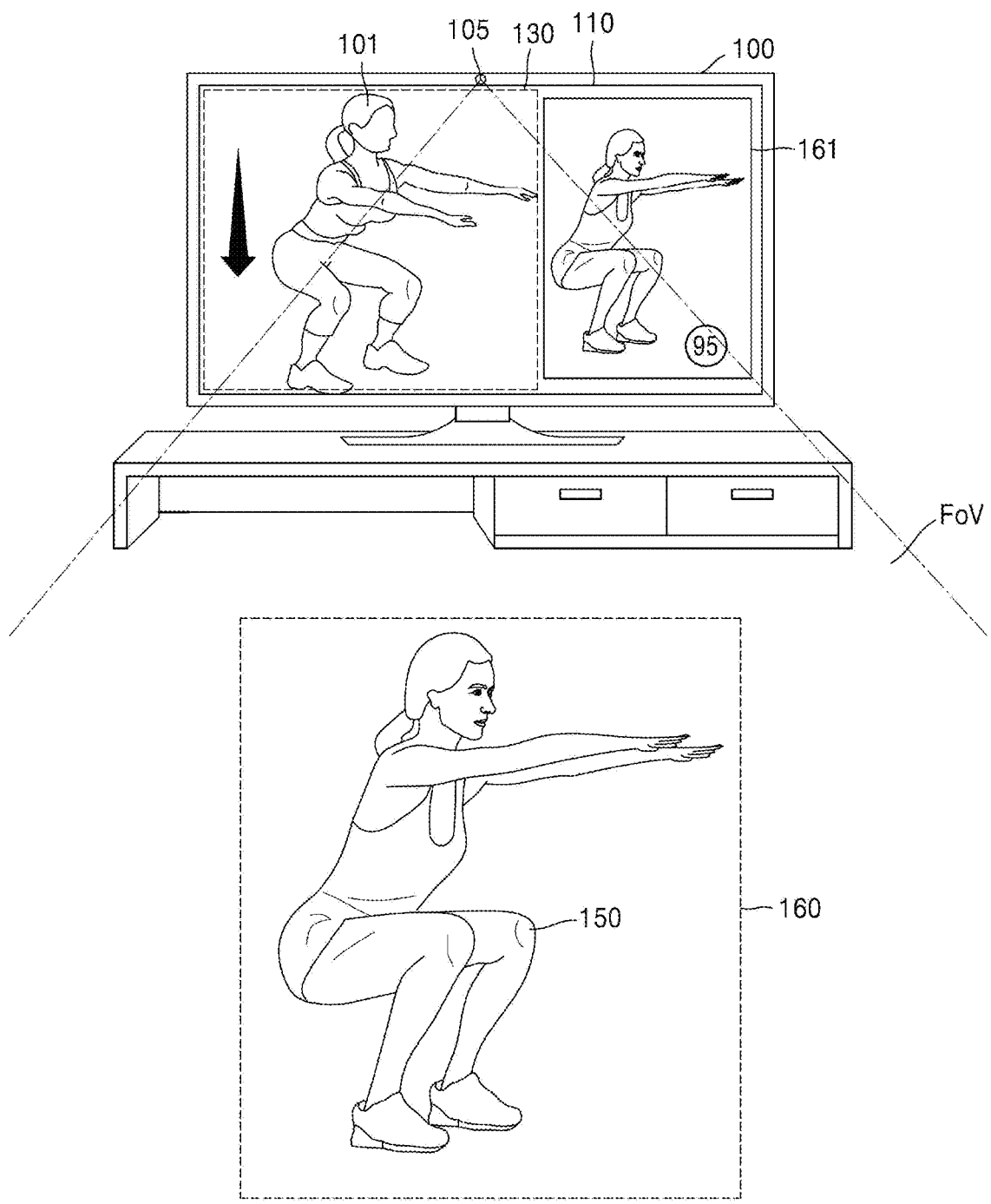
FIG. 1 is a view for explaining a display apparatus according to an example embodiment.

Throughout the disclosure, the expression "at least one of a, b or c" indicates only a, only b, only c, both a and b, both a and c, both b and c, all of a, b, and c, or variations thereof.

Embodiments of the disclosure will now be described more fully with reference to the accompanying drawings such that one of ordinary skill in the art to which the disclosure pertains may easily execute the disclosure. The disclosure may, however, be embodied in many different forms and should not be construed as being limited to the embodiments set forth herein. In the drawings, parts irrelevant to the description are omitted for the simplicity of explanation, and like numbers refer to like elements throughout. In all of the drawings, the same components are indicated by the same reference numerals or characters.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

Phrases such as "according to some embodiment" or "according to an embodiment" appearing in various places in this disclosure do not necessarily all refer to the same embodiment.

Some embodiments may be represented by functional block configurations and various processing operations. Some or all of such functional blocks may be realized by any number of hardware and/or software components configured to perform the specified functions. For example, the functional blocks of the disclosure may be implemented by one or more microprocessors, or by circuit configurations for performing an intended function. In addition, for example, functional blocks according to the disclosure may be implemented with any programming or script language. The functional blocks may be implemented as algorithms executed in one or more processors. The disclosure may employ the conventional art for electronic configuration, signal processing, and/or data processing, for example. Terms such as modules and configurations may be used broadly and are not limited to mechanical and physical configurations. Each "module" herein may comprise circuitry.

Furthermore, the connecting lines or connectors between components shown in the various figures presented are intended to represent exemplary functional relationships and/or physical or logical couplings between the components. In an actual device, a connection between components may be represented by various functional connections, physical connections, or circuit connections that are replaceable or added.

Throughout the disclosure, the expression "at least one of A, B or C" indicates only A, only B, only C, both A and B, both A and C, both B and C, or all of A, B, and C.

According to an example embodiment, a display apparatus may refer to any electronic device capable of displaying a screen corresponding to content. Here, the content may be broadcast, game, lecture, movie, home training service content, etc.

According to an example embodiment, the display apparatus may exist in various forms, such as a TV, a digital TV, a smart TV, a digital signage, a smart phone, a tablet personal computer (PC), a personal digital assistant (PDA), a laptop computer, a media player, a digital broadcasting terminal, a mobile phone, a computer, and a notebook computer. The display apparatus may have a form that is movable or portable by a user, as well as a fixed type.

A case in which the display device according to an example embodiment is a TV (e.g., a smart TV or a digital TV) will now be described and illustrated as an example.

Recently, due to the development of display apparatus technology, various applications or programs may be stored and installed in a TV to perform various functions, and various functions and services in addition to a broadcasting content playback function may be provided through the installed applications.

For example, a smart TV may be equipped with an operating system (OS) to provide various functions or services in addition to a broadcast signal reception and reproduction function.

For example, a smart TV may perform various functions, such as game content playback and video call execution, in addition to a broadcast signal reception and reproduction function.

As another example, a TV may provide a home training service. Here, the home training service is a service for allowing a user to follow an exercise motion included in content currently being played-back through a display apparatus while watching the content.

As another example, a TV may receive a user's personal information (e.g., user's gender, age, hobbies, occupation, and viewing history information about the broadcast contents the user has watched during a certain period), and may analyze the user's personal information to provide a list of optimized recommended channels to the user.

As described above, as the functions or services that a TV is able to provide are diversified, the TV may use, analyze, or process data requiring information protection, such as a user's personal information or image data corresponding to content requiring content protection.

The processing of data requiring information protection generated in a TV will now be described below with reference to the examples of FIGS. 1 and 2.

FIG. 1 is a view for explaining a display apparatus according to an example embodiment.

Referring to FIG. 1, a display apparatus 100 may provide a home training service. The home training service provided by the display apparatus 100 may be referred to a 'home fitness service', a 'home gym' service, or the like. A service for home training may be referred to as a 'home training function' or a 'home training application'.

For example, a reproduced content may be moving picture content expressing a squat motion. For example, the content may include contents in which a training instructor 101 performs a squat motion. In the above-described example, the display apparatus 100 may reproduce corresponding moving picture content by displaying or outputting images expressing the squat motion through a display 110 in real time. Then, a user 150 may watch the moving picture content reproduced on the display 110, and may follow the squat motion.

The display apparatus 100 may obtain an image of the user 150 taking a certain action by watching content while the home training service is being provided. In detail, the camera 105 included in the display apparatus 100 or electrically connectable to the display apparatus 100 may photograph the user 150 positioned in front of the display 110. Accordingly, the camera 105 may obtain an image of a user who follows the squat motion.

Then, the display apparatus 100 may analyze the image obtained by the camera 105 to classify the posture or motion of the user and obtain information used to coach the posture or motion of the user. The display apparatus 100 may control the obtained information (e.g., information used to coach a user's posture or motion) to be output on the display 110. Here, the 'information used to coach a user's posture or motion' may be referred to as 'coaching information'.

For example, referring to FIG. 1, when content is reproduced, a screen image output on the display 110 may include a guide image 130 and coaching information 161. For example, the guide image 130, which is an image for explaining a training operation, may be an image in which the training instructor 101 performs a certain operation. The coaching information 161 is information used to guide an operation of the user 150 watching the guide image 130 and following the displayed operation, and may include at least one of text or an image. For example, the coaching information 161 may be an image expressing an image obtained by photographing the user 150 following a certain motion, information indicating the accuracy of the posture or motion of the user 150 following the certain motion (score, indication of inaccurate parts, or indication of accurate parts), and indication or guidance on a part to be corrected from the posture of the user 150 following a certain motion.

An image obtained by photographing the user 150 will now be referred to as a 'user image'. For example, the camera 105 may be located in front of the display apparatus 100 to photograph a certain space 160 including as an object the user 150 following an action and obtain a user image.

The display apparatus 100 needs to obtain the user image and analyze the user image to provide the coaching information 161. Because the user image used to obtain the coaching information 161 is an image having an individual's right of portrait, the user image may be data requiring security processing.

Figure 2:
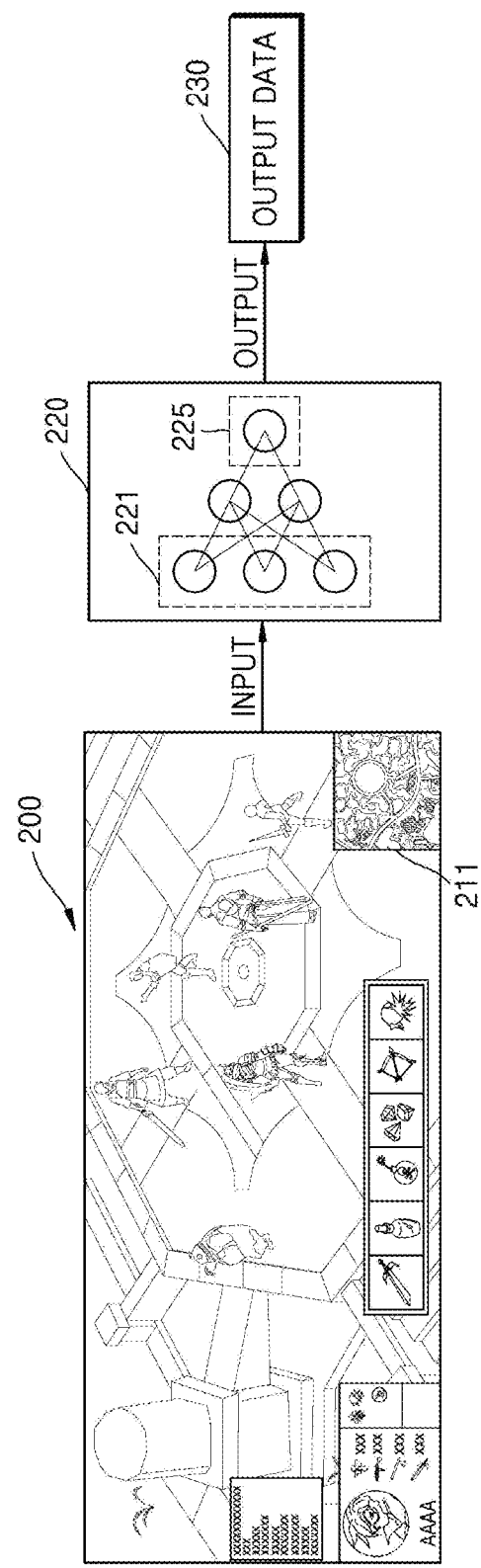
FIG. 2 is a block diagram for explaining an example of a service provided by a display apparatus according to an example embodiment.

FIG. 2 is a block diagram for explaining an example of a service provided by a display apparatus according to an example embodiment.

Referring to FIG. 2, the display apparatus according to an example embodiment may reproduce game content. In reproducing game content, various pieces of additional information or various functions may be provided to increase user satisfaction or user convenience.

For example, the display apparatus according to an example embodiment may capture a game image 200 corresponding to content currently being played back and analyze the captured game image 200, to perform an operation such as identification of whether the game image 200 is a game image or an image corresponding to media content, identification of the type of game by identifying objects included in the game image 200, or extraction of an object that a user may want to enlarge and display in the game image 200 (for example, a mini-map 211).

In general, game content is content for which copyright protection is requested. Accordingly, when a game image that is a reproduction screen image of game content is obtained, a copyright protection request may exist for the captured game image as well. Therefore, security processing for the captured game image may be needed.

Among pieces of data analyzed or used by the display apparatus 100, the user image described in the example of FIG. 1 or the game image 200 described in the example of FIG. 2, for example, may be data requiring security processing due to an issue such as personal information protection or copyright protection. Hereinafter, for convenience of description, data requiring security processing will be referred to as 'security data'.

According to an example embodiment, examples of 'security data' may include data under copyright, personal information about users, etc., data related to personal portrait rights, data encrypted for information protection, and the like.

According to recent technology development trends, artificial intelligence (AI) technology is widely used for data processing.

For example, a method of performing data classification, object recognition, object tracking and/or object differentiation, etc. by using AI technology that performs calculation through a neural network has been developed and used. Because the neural network is implemented using AI technology, the neural network may be referred to as an artificial neural network.

For example, the neural network may be a deep neural network (DNN) 220 that includes a plurality of layers to perform multi-stage calculations. For example, a DNN calculation may include a Convolutional Neural Network (CNN) calculation. In detail, a data recognition model for object recognition may be implemented via the above-illustrated neural network, and may be trained using learning data. The above-illustrated neural network may analyze input data, for example, a received image, by using a trained data recognition model to recognize, analyze and/or classify an object in the input image and output a desired result as output data. A CNN is referred to any neural network that performs an algorithm that searches for a pattern by analyzing an image, and may have various types and forms.

For example, the user image described in FIG. 1 may be input to the DNN 220, and the DNN 220 may analyze the received user image and obtain, as output data, an exercise (e.g., squat) done by the user, an exercise posture, and information for correction which are included in the user image.

As another example, the game image 200 described in FIG. 2 may be input to the DNN 220, and the DNN 220 may analyze the received game image 200 to perform an operation such as identification of whether the game image 200 is a game image or an image corresponding to media content, identification of the type of game by identifying objects included in the game image 200, or extraction of an object that a user may want to enlarge and display in the game image 200 (for example, the mini-map 211), thereby obtaining desired output data.

In FIG. 2, the DNN 220 may receive the game image 200 at an input layer 221, analyze the game image 200 to obtain output data 230, and output the output data at an output layer 225. In this case, the output data 230 may include the name of a game corresponding to the game image 200 and information about an area (e.g., the mini-map 211) that needs to be enlarged and displayed within the game image 200.

For example, the display apparatus 100 according to an example embodiment may provide necessary information to the user by using the output data 230 output by the DNN 220.

For example, when the output data 230 includes the information about the area (e.g., the mini map 211) that needs to be enlarged and displayed within the game image 200, an enlarged image corresponding to the mini-map 211 may be provided to the user, based on the output data 230. Then, the user can view an enlarged and displayed mini-map and enjoy the game more conveniently.

As another example, when the output data 230 includes an exercise (e.g., squat) done by the user, an exercise posture, and information for correction, information used to correct an exercise posture of the user (for example, coaching information) may be provided to the user, based on the output data 230. Then, a user who uses a home training service will be able to more accurately follow a home training operation by seeing the coaching information.

An example embodiment relates to a display apparatus including an operating system (OS) operating in a secure world (SWD) corresponding to a trustzone, in order to process security data requiring security processing, as described above with reference to FIGS. 1 and 2, and an operation method of the display apparatus.

An example embodiment may use a DNN based on AI technology to analyze security data, as described above with reference to FIG. 2.

A display apparatus capable of reducing the use of the resources of an SWD necessary for performing a calculation through a neural network and also increasing security performance, when input data is input to and processed by the neural network, and an operation method of the display apparatus will now be described in detail with reference to the attached drawings.

Figure 3:
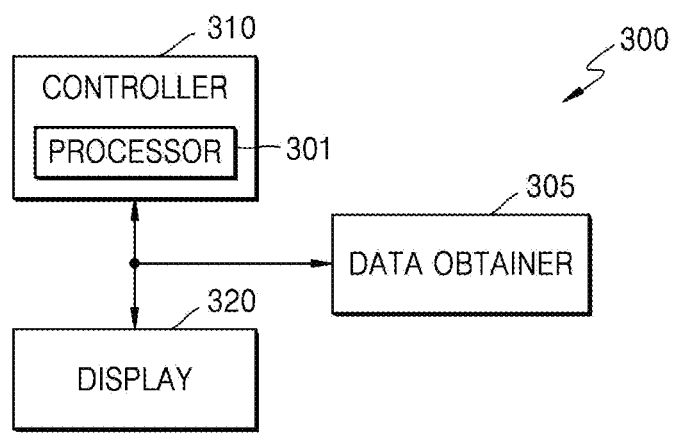
FIG. 3 is a block diagram of a display apparatus according to an example embodiment.

FIG. 3 is a block diagram of a display apparatus according to an example embodiment. A display apparatus 300 of FIG. 3 may correspond to the display apparatus 100 of FIG. 1, and a redundant description thereof will be omitted.

Referring to FIG. 3, the display apparatus 300 according to an example embodiment includes a display 320; a data obtainer 305 for obtaining input data; and a controller 310 including at least one processor 301 executing one or more instructions in order to separately operate a normal OS and a secure OS, which are respectively executed in a normal world (NWD) and an SWD corresponding to a trustzone.

For example, the controller 310 may include at least one processor 301. Although FIG. 3 illustrates an embodiment in which the controller 310 includes one processor 301, the controller 310 may include a plurality of processors.

According to an example embodiment, the processor 301 controls the following operations to be performed, by executing the one or more instructions. In detail, the processor 301 identifies whether the input data input to a DNN including a plurality of hidden layers between an input layer and an output layer corresponds to security data. When it is identified that the input data corresponds to the security data, the processor 301 controls the secure OS so that layers from the input layer of the DNN to at least one hidden layer connected to the input layer are driven within the SWD. When it is identified that the input data does not correspond to the security data, the processor 301 controls the normal OS so that the entire DNN is driven in a word other than the SWD. Here, being 'driven' may refer to performing a calculation defined in the DNN. For example, driving a DNN in an SWD may refer to loading software, a program, or an application corresponding to the DNN into a memory in the SWD and allowing the loaded DNN to perform a calculation according to a neural network in the SWD.

For example, the 'other world' may refer to an area other than the SWD. For example, the 'other world' may be an NWD included in the display apparatus 300. For example, when it is identified that input data does not correspond to security data, the processor 301 may control the normal OS so that the entire DNN is driven in the NWD.

As another example, the 'other world' may refer to an area formed on a separate device or server different from the display apparatus 300. For example, when it is identified that input data does not correspond to security data, the processor 301 may control the normal OS so that the entire DNN is driven in the separate server. In detail, the processor 301 may control the display apparatus 300 to transmit input data to an external server device and receive result data obtained by driving the entire DNN on the external server device.

For example, the OS may be referred to as an operating system, and may refer to software or a program for managing and controlling a computing device. The OS may manage hardware resources such as data input/output and/or memory allocation, and may control execution of programs. For example, the OS may manage or control a memory corresponding to a storage and/or a main memory such as a hard disk, and may manage or control an operation or task to be performed.

According to an example embodiment, an OS operating in the SWD may be identified as the secure OS, and an OS operating in the NWD may be identified as the normal OS.

For example, the processor 301 may perform an operation related to processing of data for which security needs to be kept, under a trusted execution environment (TEE), and may perform operations related to other processing under a rich execution environment (REE). For example, the processor 301 may perform a certain control operation under the REE in order to maintain a high overall control execution speed. Alternatively, when a control operation itself requires security maintenance, the processor 301 may perform a certain control operation under the TEE.

Here, the NWD and the SWD will be described in detail below with reference to FIG. 4. In addition, a DNN used in an example embodiment and an operation of separating and driving the DNN will be described in detail below with reference to FIGS. 7 through 15.

In the display apparatus 300, the controller 310 may control overall operations of the display apparatus 300. In detail, the controller 310 controls an overall operation of the display apparatus 300 and signal transfer among the internal components of the display apparatus 300, and processes data.

The controller 310 may include a memory in which at least one program for performing the above-described operation and an operation to be described later is stored, and at least one processor for executing the stored at least one program.

For example, the controller 310 may include an internal memory (not shown) and at least one processor 301, comprising processing circuitry, for executing stored at least one program. The internal memory (not shown) of the at least one processor 301 may store one or more instructions. The processor 301 may perform a certain operation by executing at least one of the one or more instructions stored in the internal memory (not shown). The processor 301 performing the certain operation may include not only a case where the processor 301 directly perform the certain operation but also a case where the processor 301 controls other components included in the display apparatus 100 (e.g., see display apparatus 300 in FIG. 3, including display 320) or another device distinguished from the display apparatus (for example, an external camera) to perform the certain operation. Even when it is described that the controller 310 controls a certain operation to be performed, this description may cover that the processor 301 controls the certain operation to be performed.

For example, the controller 310 may include RAM (not shown) that stores a signal or data input by an external source of the display apparatus 300 or is used as a memory area for various operations performed by the display apparatus 300, ROM (not shown) that stores a control program for controlling the display apparatus 300, and at least one processor 301. Examples of the ROM (not shown), which is a non-volatile memory included in the controller 310, may include a flash memory.

The at least one processor 301 may include a graphics processing unit (GPU) (not shown) for graphic processing corresponding to video. The at least one processor 301 may be implemented as a system-on-chip (SoC) into which a core (not shown) and a GPU (not shown) are integrated. The at least one processor 301 may include a single core, a dual core, a triple core, a quad core, or a multiple core thereof.

According to an example embodiment, the data obtainer 305 may obtain input data. The input data may refer to data that is to be processed through a neural network, in detail, a DNN. For example, the input data may be data that is input to an input layer of a DNN that is used in an example embodiment.

For example, the input data may be data that is intended to be used, analyzed, and/or processed in an example embodiment.

For example, the data obtainer 305 (comprising circuitry) may obtain the input data by receiving the input data from an external device. For example, the data obtainer 305 may include a communication interface (not shown) (e.g., may correspond to a communication interface 360 of FIG. 4) comprising communication and/or input circuitry, and may transmit the input data from an external device (not shown) through the communication interface. For example, the data obtainer 305 may include a communication interface (not shown), and may receive content from a content providing server through the communication interface and obtain data included in the received content as the input data. As another example, the data obtainer 305 may include an input/output (I/O) interface (not shown) comprising input and/or output circuitry, and may receive content from a source device (not shown) through the I/O interface and obtain data included in the received content as the input data.

As another example, the data obtainer 305 may obtain the input data by autonomously generating the input data. For example, the data obtainer 305 may include at least one component for generating the input data. For example, the data obtainer 305 may include a camera (not shown), and may obtain an image captured by the camera as the input data. For example, the camera included in the data obtainer 305 may correspond to the camera 105 described with reference to FIG. 1, and may obtain a user image generated through the camera 105 as the input data.

As another example, the data obtainer 305 may obtain, as the input data, data collected, stored, and/or processed by the display apparatus 300. For example, the data obtainer 305 may obtain, as the input data, view history information about broadcasting contents collected and stored in the display apparatus 300.

For example, the display 320 may display an image. For example, the display 320 may visually output an image through an internally-included display panel (not shown).

For example, the display 320 may display an image corresponding to video data through the internally-included display panel so that a user visually recognizes moving picture content. In detail, moving picture data that forms content may include a plurality of frame images, and the display 320 may reproduce the moving picture content by consecutively displaying the plurality of frame images under a control by the processor 301.

Hereinafter, an SWD and an NWD formed in the display apparatus 300 will be described in detail with reference to FIG. 4.

Figure 4:
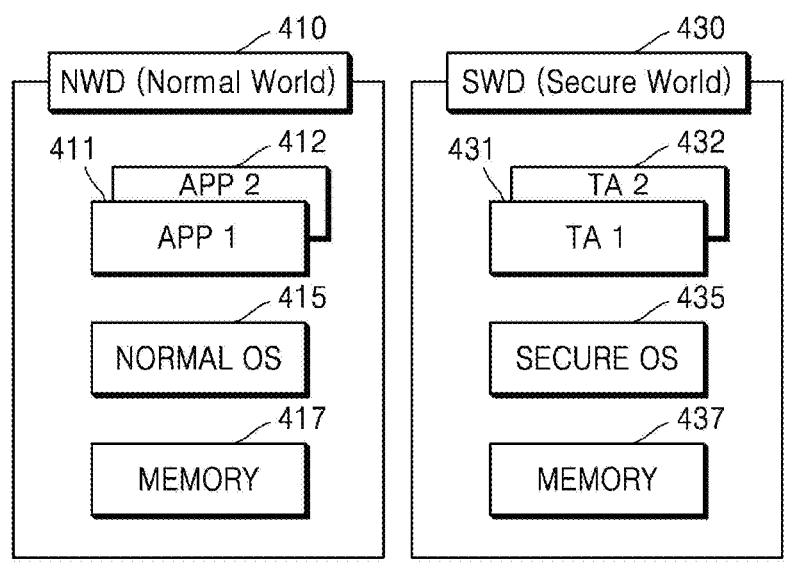
FIG. 4 is a block diagram of a secure world (SWD) and a normal world (NWD) formed in a display apparatus according to an example embodiment.

FIG. 4 is a block diagram of an SWD and an NWD formed in a display apparatus according to an example embodiment.

In processing the security data described with reference to FIGS. 1 and 2, maintaining security is important. For example, it is important to protect the security data from hacking.

As one of the security technologies for protection against hacking, a security method using a trustzone may be exemplified.

In the trustzone, which is a hardware security technology, hardware such as memory is divided into an SWD corresponding to the trustzone and an NWD, and the NWD is made unable to access the resources of the SWD, thereby protecting data received through the SWD and stored in the SWD.

For example, the 'SWD' may be a world that provides a 'TEE' because the SWD corresponds to a trustzone and its security is guaranteed. The 'NWD' may be a world that provides or secures an 'REE' because the NWD has abundant hardware resources without being limited by hardware resources like in a trustzone.

Hereinafter, for convenience of description, the SWD and a world providing the TEE are collectively referred to as an SWD, and the NWD and a world providing the REE are collectively referred to as an NWD.

According to an example embodiment, the controller 310 may include the at least one processor 301 that executes the one or more instructions to run an OS that is divided into the NWD and the SWD corresponding to the trustzone. In detail, the controller 310 may run the OS by executing the one or more instructions stored in an internal memory (not shown) included in the controller 310 or a memory (not shown) formed separately from the controller 310.

For example, hardware (not shown) forming the controller 310 may be formed by being divided into the NWD and the SWD corresponding to the trustzone. The hardware (not shown) may include a GPU, a central processing unit (CPU), etc. that form at least one processor included in the controller 310. The processor (not shown) may be implemented as an SoC into which a core (not shown) and a GPU (not shown) are integrated. For example, hardware forming the controller 310, for example, an SOC, may be formed by being divided into the NWD and the SWD corresponding to the trustzone.

Software (not shown) forming the controller 310 (e.g., an OS) may be formed or executed differently within the NWD and the SWD corresponding to the trustzone.

Referring to FIG. 4, the controller 310 may be formed by being divided into an NWD 410 and an SWD 430. In detail, an OS executed in the display apparatus 300 according to an example embodiment may be divided into the NWD 410 and the SWD 430 corresponding to the trustzone. The NWD 410 corresponds to a REE world, and the SWD 430 corresponds to a TEE world. The REE world is relatively weak to security compared to the TEE world.

A case in which an application that receives and processes input data in the form of an image operates in the SWD 430 will now be illustrated. In this case, an external attacker such as malware may steal the input data input to the application through a method such as screen capturing. In order to address security vulnerabilities that may occur in the NWD, the application may be operated in the SWD 430.

According to a trustzone setting technology, the NWD 410 is unable to access resources existing in the SWD 430. In detail, the NWD may be accessed through only a minimum authenticated path with the SWD area, and the NWD and the SWD may be operated independently. Accordingly, the trustzone setting technology may provide a high level of security.

Here, the resources may refer to i) data input to the OS, and ii) various types of data generated, processed, and/or stored in the OS. In detail, in order to address a security problem such as data leakage that may occur while inputting, processing and/or storing data, a processor running the OS may enable at least one operation for inputting, processing and/or storing data to be performed in the SWD 430.

For example, the NWD 410 may include one or more applications 411 and 412, an OS 415 operating in the NWD, and a memory 417. The one or more applications 411 and 412, and the OS 415 operating in the NWD may be each stored and executed in the NWD 410. In FIG. 4, the OS 415 operating in the NWD is illustrated as a 'normal OS'.

For example, the SWD 430 may include one or more applications 431 and 432, an OS 435 operating in the SWD, and a memory 437. The one or more applications 431 and 432, and the OS 435 operating in the SWD may be each stored and executed in the SWD 430. In FIG. 4, an application executed in the SWD is illustrated as a trusted application (TA), and the OS 435 operating in the SWD is illustrated as a 'secure OS'.

Because the applications, the OSs, and the memories shown in FIG. 4 are general configurations of a computing device, detailed descriptions thereof will be omitted.

For example, data to be processed in the SWD 430, for example, input data, may be temporarily stored in the memory 437. The secure OS 435 may manage the input data stored in the memory 437 to be loaded into the application 431, which is to receive and process the input data. The secure OS 435 may control unauthorized programs or data to not access the SWD 430 through a legitimate authentication procedure. Accordingly, the display apparatus including the SWD 430 may secure security performance in data processing for maintaining security.

However, as described above, the memory capacity of the SWD is very small compared to the NWD. Accordingly, the SWD is limited in the capacity of storable resources compared to the NWD, and is also limited in the amount and speed of work that can be processed. Furthermore, when a certain operation is performed in the SWD, the SWD lacks programs, tools, and/or resources that are helpful in performing the certain operation, and thus provides a low processing speed compared with when the certain operation is performed in the NWD.

In addition, the calculation of a DNN using AI technology generally has a large amount of calculations, and accordingly, a large amount of memory allocation is unavoidable to perform a calculation according to the DNN within the SWD. However, due to the above-described limitation of resource capacity, a processing speed may decrease when the calculation according to the DNN is performed in the SWD.

Therefore, an example embodiment separates and drives only a portion of the DNN in the SWD based on the input data, so that a desired operation may be quickly performed without degrading the security performance. Separation and driving of the DNN according to an example embodiment will now be described in detail with reference to FIGS. 7 through 15.

Figure 5:
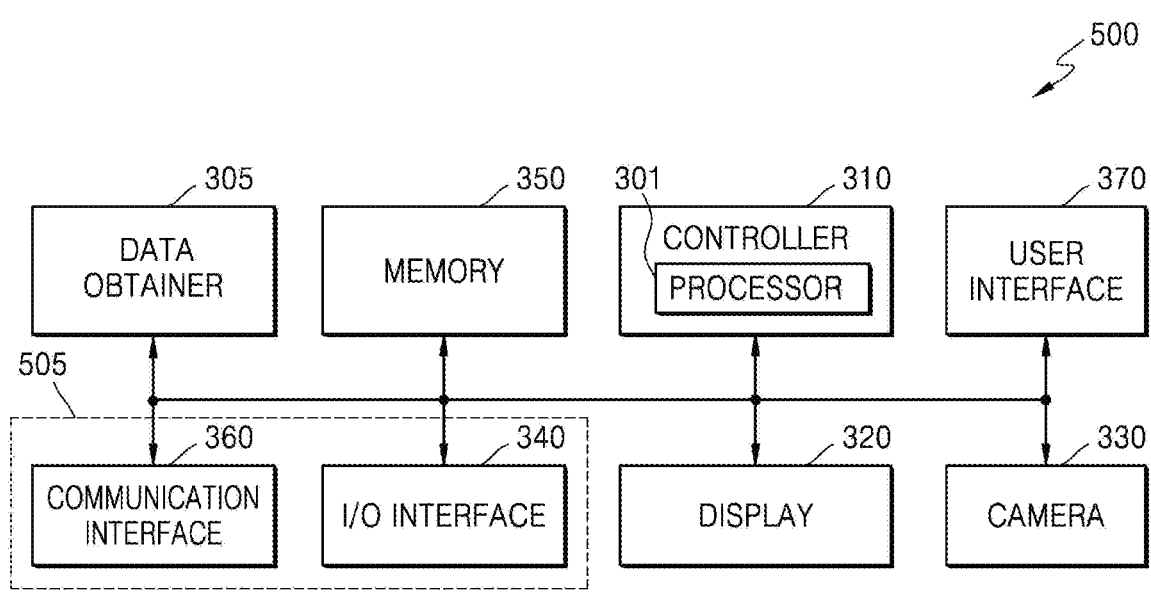
FIG. 5 is another block diagram of a display apparatus according to an example embodiment.

FIG. 5 is another block diagram of a display apparatus according to an example embodiment.

A display apparatus 500 of FIG. 5 may correspond to the display apparatus 100 of FIG. 1 or the display apparatus 300 of FIG. 3. Components of FIG. 5 that are the same as the components of FIG. 3 are indicated by the same reference numerals or characters. Accordingly, descriptions of the display apparatus 500 that are the same as those made with reference to FIGS. 1 through 4 are not repeated herein.

Referring to FIG. 5, the display apparatus 500 may further include at least one of a communication interface 505, a camera 330, a memory 350, or a user interface 370, compared with the display apparatus 300 of FIG. 2.

The memory 350 may store at least one instruction. The memory 350 may store at least one instruction that the processor 301 executes. The memory 350 may store at least one program that the processor 301 executes. Alternatively, the memory 350 may store an application for providing a certain function, a certain operation, and/or a certain service. According to an example embodiment, the memory 350 may store a DNN. The DNN may correspond to the DNN 220 briefly described with reference to FIG. 2.

For example, the memory 350 may be formed by being separated into the SWD and the NWD as described above with reference to FIG. 4. For example, at least a portion of the memory 350 may be disposed in the SWD, and the rest may be disposed in the NWD.

For example, the memory 350 may store information or data that is used in an operation of the display apparatus 500. The memory 350 may also store content reproducible by the display apparatus 500. Alternatively, the memory 350 may store input data that is to be input to the DNN.

For example, the memory 350 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The communication interface 505 may include at least one among from at least one communication module, comprising communication circuitry, transmitting or receiving data to or from an external device, or at least one port. In detail, the communication interface 505 may include a communication interface 360 and an I/O interface 340.

For example, the communication interface 360 performs communication with an external device (not shown) through at least one wired or wireless communication network. According to an example embodiment, the communication interface 360 may communicate with the external device. The external device may be a server, and the communication interface 360 may perform communication with a server (not shown). The server (not shown) may be a content providing server, an Internet server, etc. Alternatively, the server (not shown) may be a server that analyzes and/or processes an image. Alternatively, the server (not shown) may be a server that manufactures and/or distributes an application. Alternatively, the server (not shown) may be a server that performs a calculation according to a neural network by using AI technology.

For example, the communication interface 360 may be formed in a form including at least one communication module comprising communication circuitry, a communication circuit, and/or the like, and may transmit or receive data to or from the external device through the communication module and/or the communication circuit.

For example, the communication interface 360 may include at least one communication module (not shown) that performs communication according to a communication standard such as Bluetooth, Wi-Fi, Bluetooth Low Energy (BLE), near field communication (NFC)/radio frequency identification (RFID), Wi-Fi Direct, ultra wideband (UWB), or ZIGBEE.

For example, the communication interface 360 may further include a server (not shown) for supporting long-distance communication according to a long-distance communication standard, and a communication module (not shown) for performing communication. In detail, the communication interface 360 may include a communication module (not shown) for performing communication via a network for Internet communication. The communication interface 360 may include a communication network following a communication standard such as 3G, 4G, 5G, and/or 6G.

The communication interface 360 may include a communication module, comprising communication circuitry, capable of receiving a control command from a remote controller (not shown) located in a short distance, for example, an infrared (IR) communication module. In this case, the communication interface 360 may receive a control command from the remote controller (not shown). For example, the control command received from the remote controller (not shown) may include a turn-on or turn-off command, and a signal for requesting execution of a certain application.

For example, the I/O interface 340 may include a High-Definition Multimedia Interface (HDMI) port (not shown), a component jack (not shown), a PC port (not shown), or a USB port (not shown). The I/O interface 340 may include a combination of the HDMI port, the component jack, the PC port, and the USB port. In this case, the I/O interface 340 may directly receive moving picture data corresponding to the content to be reproduced on the display apparatus 500 through the HDMI port, the component jack, the PC port, or the USB port.

The user interface 370 may receive a user input for controlling the display apparatus 500. The user interface 370 may include, but is not limited to, a touch panel for sensing a user's touch, a button for receiving a user's push operation, a wheel for receiving a user's rotation operation, a keyboard, and a dome switch.

The user interface 370 may include a voice recognition device (not shown) for voice recognition. For example, the voice recognition device may be a microphone, and the voice recognition device may receive a user's voice command or voice request. Accordingly, the processor 301 may control an operation corresponding to the voice command or voice request to be performed.

The user interface 370 may also include a motion detection sensor (not shown). For example, the motion detection sensor (not shown) may detect a motion of the display apparatus 500 and receive the detected motion as a user input. The voice recognition device (not shown) and the motion detection sensor (not shown) may be included in the display apparatus 500 as a module independent from the user interface 370, rather than being included in the user interface 370.

For example, at least one of the camera 330, the communication interface 360, or the I/O interface 340 may be disposed to be included in the data obtainer 305. For example, the data obtainer 305 is configured to obtain the input data, and may include one or more circuits and/or components for obtaining the input data. As another example, the data obtainer 305 may obtain the input data by receiving the input data from a separate circuit and/or component that generates the input data.

For example, according to an example embodiment, when input data input to the input layer of the DNN is an image, the camera 330 may obtain the input data generated by photographing the image. The processor 301 may control the input data obtained by the camera 330 to be input to the input layer of the DNN. FIG. 5 illustrates a case in which the camera 330, the communication interface 360, and the I/O interface 340 are formed as separate components from the data obtainer 305.

Figure 6:
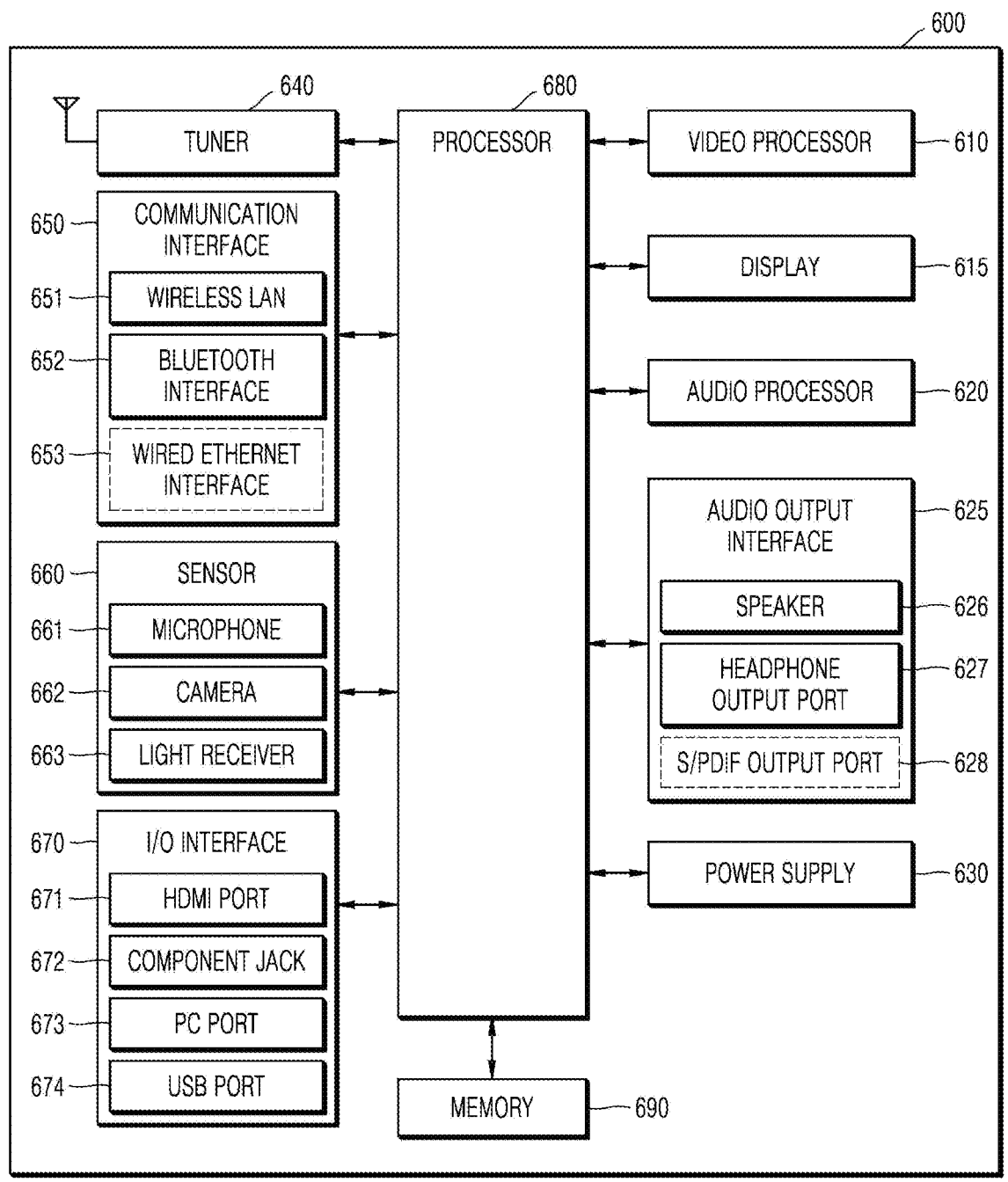
FIG. 6 is another block diagram of a display apparatus according to an example embodiment.

FIG. 6 is another block diagram of a display apparatus according to an example embodiment. A display apparatus 600 of FIG. 6 may correspond to the display apparatus 100, 300, or 500 according to an example embodiment described above with reference to FIGS. 1 through 5. Accordingly, descriptions of the display apparatus 600 that are the same as those made with reference to FIGS. 1 through 5 are not repeated herein.

Referring to FIG. 6, the display apparatus 600 includes a video processor 610, a display 615, an audio processor 620, an audio output interface 625, a power supply 630, a tuner 640, a communication interface 650, a sensor 660, an I/O interface 670, a processor 680, and a memory 690.

The communication interface 650, the display 615, a camera 662, the I/O interface 670, the processor 680, and the memory 690 of the display apparatus 600 may correspond to the communication interface 360, the display 320, the camera 330, the I/O interface 340, the processor 301, and the memory 350 of FIG. 5, respectively. Accordingly, descriptions of the display apparatus 600 that are the same as those made with reference to FIGS. 2 and 5 are not repeated herein.

The video processor 610 processes video data that is received by the display apparatus 600. The video processor 610 may perform a variety of image processing, such as decoding, scaling, noise filtering, frame rate transformation, and resolution transformation, on the received video data.

The display 615 displays video included in a broadcasting signal received via the tuner 640 on the screen thereof, under a control by the processor 680. The display 615 may also display content (for example, a moving picture) that is input via the communication interface 650 or the I/O interface 670.

The display 615 may output an image stored in the memory 690 under a control by the processor 680. The display 615 may include a voice user interface (UI) (e.g., including a voice instruction guide) for performing a voice recognition task corresponding to voice recognition or a motion UI (e.g., including a user motion guide for motion recognition) for performing a motion recognition task corresponding to motion recognition.

The audio processor 620 processes audio data. The audio processor 620 may perform a variety of processing, such as decoding, amplification, or noise filtering, on the audio data. The audio processor 620 may include a plurality of audio processing modules, comprising processing circuitry, to process audios corresponding to a plurality of pieces of content. Each processor herein comprises processing circuitry.

The audio output interface 625 outputs audio included in a broadcasting signal received via the tuner 640, under a control by the processor 680. The audio output interface 625 may output audio (for example, a voice or a sound) that is input via the communication interface 650 or the I/O interface 670. The audio output interface 625 may also output audio stored in the memory 690 under a control by the processor 680. The audio output interface 625 may include at least one of a speaker 626, a headphone output port 627, or a Sony/Philips Digital Interface (S/PDIF) output port 628. The audio output interface 625 may include a combination of the speaker 626, the headphone output port 627, and the S/PDIF output port 628.

The power supply 630 supplies power that is input from an external power source, to the internal components 610 through 690 of the display apparatus 600, under the control by the processor 680. The power supply 630 may also supply power that is output by one or more batteries (not shown) located in the display apparatus 600, to the internal components 610 through 690 of the display apparatus 600, under the control by the processor 680.

The tuner 640 may tune and select a frequency band corresponding to a channel that the display apparatus 600 wants to receive, from among many radio wave components that are obtained by, for example, amplifying, mixing, or resonating a wired or wireless broadcasting signal. The broadcasting signal includes audio, video, and additional information (for example, an electronic program guide (EPG)).

The tuner 640 may receive a broadcasting signal in a frequency band corresponding to a channel number (e.g., cable broadcasting No. 506) according to a user input (for example, a control signal received from an external control device (not shown) (e.g., a remote controller), e.g., a channel number input, a channel up-down input, and a channel input on an EPG screen image).

The tuner 640 may receive a broadcasting signal from various sources, such as terrestrial broadcasting, cable broadcasting, satellite broadcasting, and Internet broadcasting. The tuner 640 may also receive a broadcasting signal from a source such as analog broadcasting or digital broadcasting. The broadcasting signal received via the tuner 640 is decoded (for example, audio decoding, video decoding, or additional information decoding) and is thus divided into audio, video, and/or additional information. The audio, the video, and/or the additional information may be stored in the memory 690 under the control by the processor 680.

The display apparatus 600 may include a single tuner 640 or a plurality of tuners 640. According to an embodiment, when a plurality of tuners 640 are included, the plurality of tuners 640 may output a plurality of broadcasting signals to a plurality of windows included in a multi-window screen image provided to the display 615.

The tuner 640 may be all-in-one with the display apparatus 600, or implemented as a separate device (for example, a tuner (not shown) that is connected to a set-top box (not shown) and the I/O interface 670) having a tuner that is electrically connected to the display apparatus 600.

The communication interface 650 may connect the display apparatus 600 to an external device (for example, an external camera, a smartphone, or an audio device) under the control by the processor 680. The processor 680 may transmit/receive content to/from the external device connected via the communication interface 650, download an application from the external device, or perform web-browsing. In detail, the communication interface 650 may be connected to a network to receive content from an external device (not shown).

As described above, the communication interface 650 may include at least one of a short-range wireless communication module (not shown), a wired communication module (not shown), or a mobile communication module (not shown).

FIG. 6 illustrates a case where the communication interface 650 includes a wireless LAN 651, a Bluetooth interface/network 652, or a wired Ethernet interface/network 653.

The communication interface 650 may include a module combination including one or more of the wireless LAN 651, the Bluetooth interface/network 652, and the wired Ethernet network 653. The communication interface 650 may receive a control signal of a control device (not shown) under the control by the processor 680. The control signal may be implemented as a Bluetooth signal, a radio frequency (RF) signal, or a Wi-Fi signal.

The communication interface 650 may further include short-range communication (for example, near field communication (NFC) or Bluetooth low energy (BLE)), in addition to the Bluetooth interface/network 652.

The sensor 660 senses a voice of a user, an image of the user, or an interaction with the user.

According to an example embodiment, the sensor 660 may obtain data for identifying a gesture of the user. In detail, the sensor 660 may include the camera 662, and may obtain the data for identifying a gesture of the user (e.g., an image representing the user's gesture) by using the camera 662. The sensor 660 may further include at least one of a microphone 661 or a light receiver 663.

The microphone 661 receives an uttered voice of the user. The microphone 661 may transform the received voice into an electrical signal and output the electrical signal to the processor 680. The user voice may include, for example, a voice corresponding to a menu or function of the display apparatus 600. For example, a recognition range of the microphone 661 may be recommended to be within 4 m from the microphone 661 to a location of the user, and may vary in correspondence to the magnitude of the voice of the user and a surrounding environment (for example, a speaker sound or ambient noise).

The microphone 661 may be integrated with or separate from the display apparatus 600. The separated microphone 661 may be electrically connected to the display apparatus 600 via the communication interface 650 or the I/O interface 670.

It will be easily understood by one of ordinary skill in the art that the microphone 661 may be excluded according to the performance and structure of the display apparatus 600.

The camera 662 receives an image (for example, consecutive frames) corresponding to a motion of the user including a gesture within a recognition range of the camera 662. For example, the recognition range of the camera 662 may be a distance within 0.1 to 5 m from the camera 662 to the user. The motion of the user may include a part of the body of the user, such as the face, a facial expression, the hand, the fist, and a finger of the user, or a motion or the like of the part of the body of the user. The camera 662 may convert a received image into an electrical signal under the control by the processor 680 and output the electrical signal to the processor 680.

The processor 680 may select a menu that is displayed on the display apparatus 600 by using a result of the recognition of the received motion, or perform control corresponding to a result of the motion recognition. Examples of the control may include channel adjustment, volume adjustment, or indicator movement.

The camera 662 may include a lens (not shown) and an image sensor (not shown). The camera 662 may support optical zoom or digital zoom by using a plurality of lenses and image processing. The recognition range of the camera 662 may be variously set according to the angle of the camera 662 and surrounding environment conditions. When the camera 662 is composed of a plurality of cameras, a three-dimensional (3D) still image or a 3D motion may be received by the plurality of cameras.

The camera 662 may be integrated with or separate from the display apparatus 600. A separate device (not shown) including the separate camera 662 may be electrically connected to the display apparatus 600 via the communication interface 650 or the I/O interface 670.

It will be easily understood by one of ordinary skill in the art that the camera 662 may be excluded according to the performance and structure of the display apparatus 600.

The light receiver 663 receives an optical signal (including a control signal) from the external control device (not shown) via a light window (not shown) of the bezel of the display 615. The light receiver 663 may receive an optical signal corresponding to a user input (for example, touch, pressing, a touch gesture, a voice, or a motion) from the control device (not shown). A control signal may be extracted from the received optical signal under the control by the processor 680.

For example, the light receiver 663 may receive a signal corresponding to a pointing location of the control device (not shown) and transmit the received signal to the processor 680. For example, when a user interface screen image for receiving data or a command from a user has been displayed via the display 615 and the user wants to input data or a command to the display apparatus 600 via the control device (not shown), the user moves the control device (not shown) while touching a touch pad (not shown) provided in the control device, and, at this time, the light receiver 663 may receive a signal corresponding to a motion of the control device (not shown) and transmit the received signal to the processor 680. The light receiver 663 may receive a signal indicating that a certain button provided on the control device has been pressed, and transmit the received signal to the processor 680. For example, when the user presses a button-type touch pad (not shown) provided in the control device with his or her finger, the light receiver 663 may receive a signal indicating that the button-type touch pad has been pressed, and transmit the received signal to the processor 680. For example, the signal indicating that the button-type touch pad has been pressed may be used as a signal for selecting one from among items.

The I/O interface 670 receives video (for example, a moving picture), audio (for example, a voice or music), and additional information (for example, an EPG) from outside the display apparatus 600 under the control by the processor 680. The I/O interface 670 may include a HDMI port 671, a component jack 672, a PC port 673, or a USB port 674. The I/O interface 670 may include a combination of the HDMI port 671, the component jack 672, the PC port 673, and the USB port 674.

It will be understood by one of ordinary skill in the art that the structure and operation of the I/O interface 670 may be variously implemented according to embodiments.

The processor 680 controls an overall operation of the display apparatus 600 and signal transfer among components of the display apparatus 600 and processes data. When there is an input of a user or stored preset conditions are satisfied, the processor 680 may run an OS and various applications that are stored in the memory 690.

Figure 7:
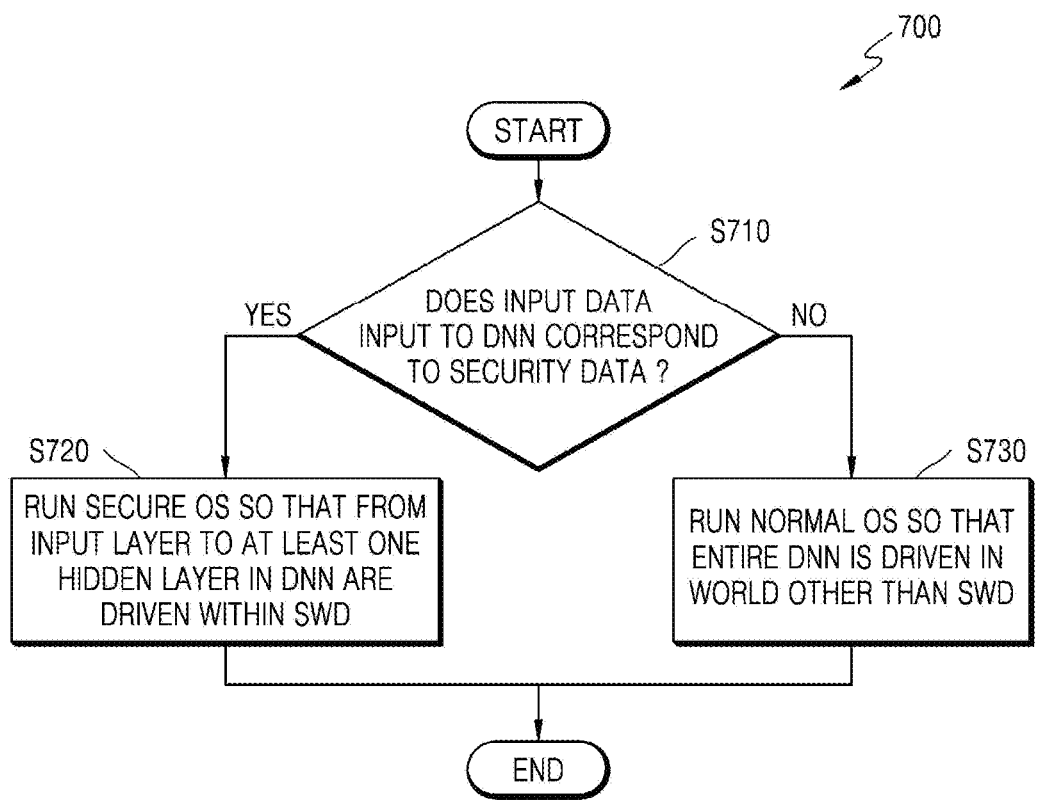
FIG. 7 is a flowchart of an operation method of a display apparatus, according to an example embodiment.

FIG. 7 is a flowchart of an operation method 700 of a display apparatus, according to an example embodiment. In detail, an operation method 700 of the display apparatus of FIG. 7 may be a flowchart illustrating operations performed by the display apparatus 100, 300, 500 or 600 according to an example embodiment described above with reference to FIGS. 1 through 6. Thus, a repeated description of the operations performed by the display apparatus 100, 300, 500 or 600 given above with reference to FIGS. 1 through 6 is omitted in the description of the operations included in the operation method 700 of the display apparatus.

A case in which an operation method 700 of the display apparatus and operations to be described later with reference to FIGS. 8 through 18 are performed by the display apparatus 500 of FIG. 5 will now be described for convenience of explanation. A case in which the operation method 700 of the display apparatus and the operations to be described later with reference to FIGS. 8 through 18 are performed within at least one of the NWD 410 or the SWD 430 corresponding to the trustzone described above with reference to FIG. 4 will now be described for convenience of explanation.

Referring to FIG. 7, the operation method 700 of the display apparatus is an operation method of a display apparatus including at least one processor that distinguishes and operates a normal OS and a secure OS, which respectively operate in the NWD and the SWD corresponding to the trustzone.

In the operation method 700 of the display apparatus, it is identified whether input data input to a DNN including a plurality of hidden layers between an input layer and an output layer corresponds to security data (S710). Operation 5710 may be performed by the processor 301. For example, operation 5710 may be performed by the processor 301 operating in the normal OS 410.

The security data may refer to data that requires security processing.

According to an example embodiment, examples of the 'security data' may include data under copyright, personal information about users, etc., data related to personal portrait rights, data related to personal characteristics (e.g., voice features of users), data encrypted for information protection, and the like. For example, the user image described in the example of FIG. 1 or the game image 200 described in the example of FIG. 2, for example, may be data requiring security processing due to an issue such as personal information protection or copyright protection. The security data may also be any data in which the possibility of hacking exists.

For example, when a copyright is set on content including at least one of photos, images, audio, or text, at least a portion of content data may be encrypted to protect the copyright of the content, and thus the content may be protected against being reproduced or executed by unauthorized persons. For example, in order to protect the copyright of the content, Digital Rights Management (DRM) encrypting may be performed on the content data. Alternatively, content input through HDMI/Screen mirroring may be protected by High-bandwidth Digital Content Protection (HDCP).

Processing of the security data as described above may be performed in the SWD 430 providing a TEE.

For example, when the input data corresponds to at least one of user input data, content protection data, or personal information of a user, the processor 301 may identify that the input data corresponds to the security data.

For example, in operation S710, identification of the security data may be made by determining whether DRM encryption for copyright protection of content has been applied to the input data.

For example, in operation S710, the identification of the security data may be made by determining whether the input data is data generated through direct utterance or input by the user. As another example, in operation S710, the identification of the security data may be made by determining whether the input data is information created or processed based on the personal information of the user.

According to an example embodiment, when data desired to be processed in the DNN is security data, operation S720 may be subsequently performed to drive a portion of the DNN receiving the security data in the SWD 430 providing a TEE.

The DNN used in an example embodiment will be described later in detail with reference to FIGS. 8 through 10.

AI technology may be composed of machine learning such as deep learning and element technologies using machine learning. AI technology is widely used in technical fields such as classification/identification, linguistic understanding, visual understanding, deduction/prediction, knowledge representation, and operation control.

For example, AI technology may be used in visual understanding and deduction/prediction. In detail, a technology for analyzing and classifying input data by using AI technology may be implemented. In other words, AI technology may be used to implement a method and apparatus capable of analyzing and/or classifying input data to obtain a desired result.

The AI technology may be implemented using an algorithm. Here, the algorithm for implementing the AI technology or a set of the algorithms is referred to as a neural network. For example, the neural network may receive input data, perform a calculation for the aforementioned analysis and classification, and output result data. In this way, in order for the neural network to accurately output the result data corresponding to the input data, the neural network needs to be trained. Here, the 'training' may refer to training the neural network so that the neural network discovers or learns by itself a method of receiving various pieces of data and analyzing the received data, a method of analyzing the received data pieces, a method of classifying the received data pieces, and/or a method of extracting a feature necessary for result data creation from the received data pieces. Here, 'training' may be expressed as 'learning' or 'training'.

In addition, a set of algorithms for outputting output data corresponding to input data through the above-described neural network, software for executing the set of algorithms, and/or hardware for executing the set of algorithms are referred to as an 'AI model' (or an 'artificial intelligence model'). The AI model may be formed in a form including one neural network, or may be formed in a form in which a plurality of neural networks are combined. For example, the AI model may be used in the same sense as a DNN.

According to an example embodiment, the neural network may be a DNN including a plurality of hidden layers between an input layer and an output layer. For example, when a hidden layer includes a plurality of layers, this may be expressed as having a plurality of depths.

For example, the DNN may be composed of a plurality of neural network layers. Each of the plurality of neural network layers has a plurality of weight values, and performs a calculation of the layer through a calculation between a calculation result of a previous layer and the plurality of weight values. For example, the DNN may be a set of algorithms, hardware, and/or a program for learning a method of recognizing an object from an image input to a neural network based on AI technology.

According to an example embodiment, the DNN outputs a result corresponding to the input data by performing a calculation through the plurality of layers.

Figure 8:
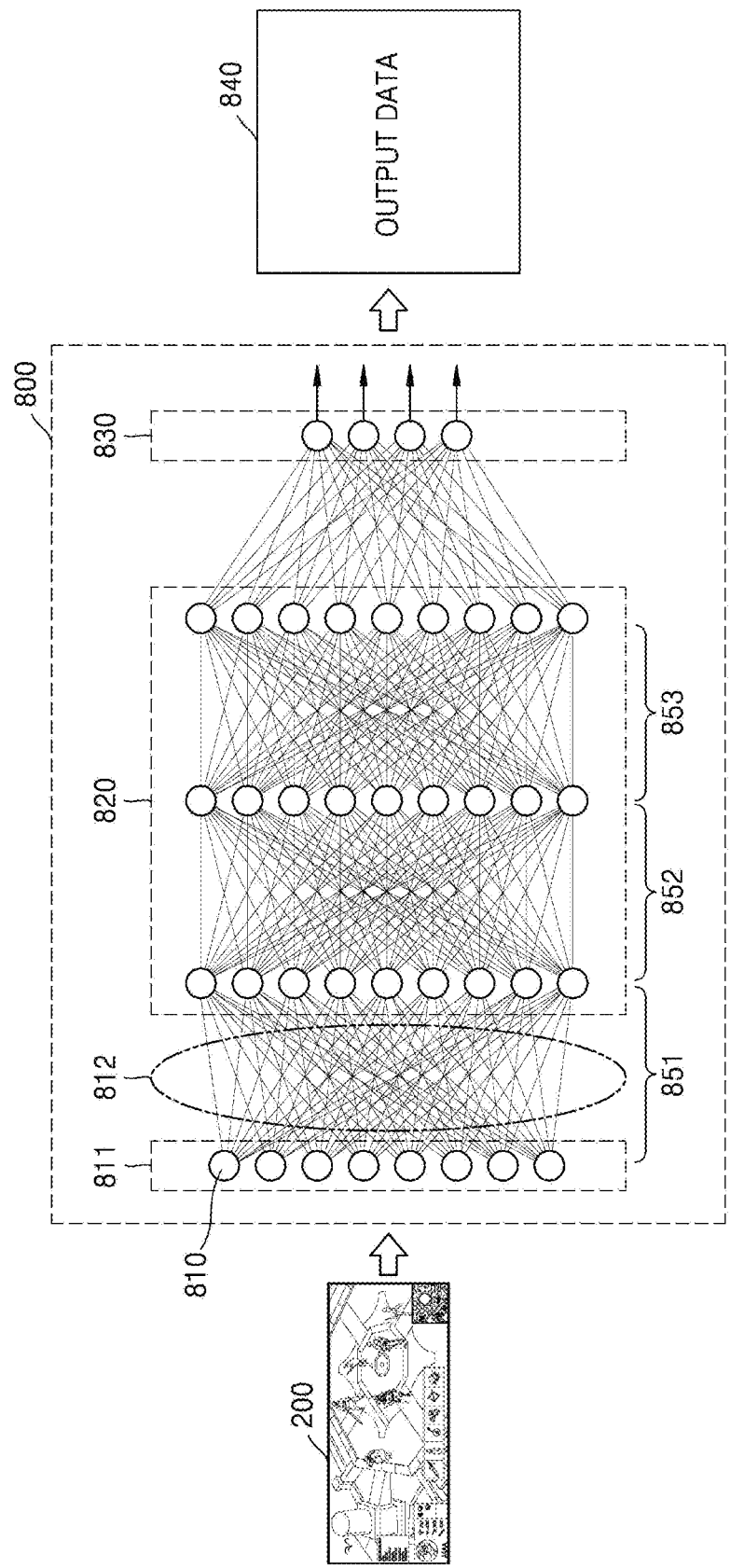
FIG. 8 is a block diagram for explaining a deep neural network (DNN) used in a display apparatus according to an example embodiment.

FIG. 8 is a block diagram for explaining a DNN that is used in a display apparatus according to an example embodiment.

Referring to FIG. 8, a DNN 800 may receive an image as input data. In FIG. 8, a case in which the input data of the DNN 800 is the game image 200 described with reference to FIG. 2 is illustrated and described.

An AI model used in an example embodiment may be formed as a DNN for recognizing and classifying an object included in an input image by analyzing the input image.

For example, a neural network (in detail, a DNN) may learn a method of recognizing an object from an image, based on (i) supervised learning using an image as an input value and/or (ii) unsupervised learning of discovering a pattern or method for recognizing an object from an image, by self-learning the type of data necessary for recognizing an object from an image without supervision. As another example, the neural network may learn a method of recognizing an object from an image, by using reinforcement learning using a feedback regarding whether a result of recognizing an object according to training is correct. As another example, the neural network may learn a method of recognizing an object from an image, by using semi-supervised learning.

For example, the DNN 800 may be a neural network for performing a convolution operation of analyzing and processing an image. Examples of the DNN may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or a Deep Q-Networks, and but the neural network according to an example embodiment is not limited to the above-described examples except in cases where it is specified. The CNN may be classified into a Deep Convolution Neural Network (DCNN) or a Capsnet neural network (not shown). The DNN 800 may be in the form of a combination of a plurality of different types of neural networks.

Referring to FIG. 8, the DNN 800 may perform a calculation for obtaining a desired result, by including an input layer 811, a hidden layer 820, and an output layer 830.

For example, each of the plurality of layers forming the DNN 800 may include one or more nodes. For example, the input layer 811 may include one or more nodes (e.g., 810)

that receive data. FIG. 8 illustrates a case in which the input layer 811 includes a plurality of nodes.

For example, the input layer 811 may receive, through a plurality of nodes 810, a plurality of images obtained by scaling the input image 200, respectively. In detail, the plurality of images obtained by scaling the input image 200 for each frequency band may be input to the plurality of nodes 810.

In the DNN 800, the hidden layer 820 may be formed of a plurality of layers. FIG. 8 illustrates a case in which the hidden layer 820 includes a first hidden layer 851, a second hidden layer 852, and a third hidden layer 853. For example, hidden layers connected to the input layer 811 may be referred to as the first hidden layer 851, the second hidden layer 852, the third hidden layer 853, . . . , and an n-th hidden layer in the order of connection.

As shown in FIG. 8, two adjacent layers may be connected to each other via a plurality of edges (e.g., 812). The edges may fully connect or partially connect a plurality of nodes included in one layer to a plurality of nodes included in an adjacent layer. Because the plurality of nodes have weight values, respectively, the DNN 800 may obtain output data, based on a value obtained by performing a calculation, for example, a convolution operation, with respect to an input signal and each of the weight values.

FIG. 8 illustrates a case in which nodes included in one layer and nodes included in another adjacent layer are connected to each other in a 'fully-connected' manner. However, the nodes included in one layer and the nodes included in another adjacent layer may be partially connected to each other. In this case, at least one of the nodes included in one layer may not be connected to and at least one of the nodes included in another adjacent layer.

The DNN 800 may be trained based on a plurality of training images and thus may be constructed as an object recognition model for recognizing an object included in an image. In detail, in order to increase the accuracy of a result output through the DNN 800, the DNN 800 may repeatedly perform training in a direction from the output layer 830 to the input layer 811, based on the plurality of training images, and may correct weight values to increase the accuracy of the output result.

The DNN 800 having the finally corrected weight values may be used as an object recognition model. When the DNN 800 is trained to receive an image and recognize an object included in the image, when the DNN 800 receives an image 200, the DNN 800 may analyze the image 200 and output output data 840 corresponding to the image 200.

For example, when the DNN 800 is trained to classify whether an input image is a game image or another type of content image, the output data 840 may include information indicating that the input image 200 may be a 'game' image.

As another example, when the DNN 800 is trained to analyze an object included in an input image to identify the name or type of a corresponding game, the output data 840 may include information about the name of a game corresponding to a game image that is the input image 200 and the type of the game.

As another example, when a user image obtained by photographing a user as in the example of FIG. 1 is received as input data and the DNN 800 is trained to identify and analyze an exercise posture of an object (e.g., the user 150) included in an input image to output the coaching information 161 about the motion posture of a corresponding user, the output data 840 may include information related to the user's exercise posture (e.g., information (score, indication of inaccurate parts, or indication of accurate parts, etc.) indicating the accuracy of the posture or motion of the user 150 following a certain motion, and information about a part to be corrected from among the posture of the user 150 following a certain motion).

Figure 9:
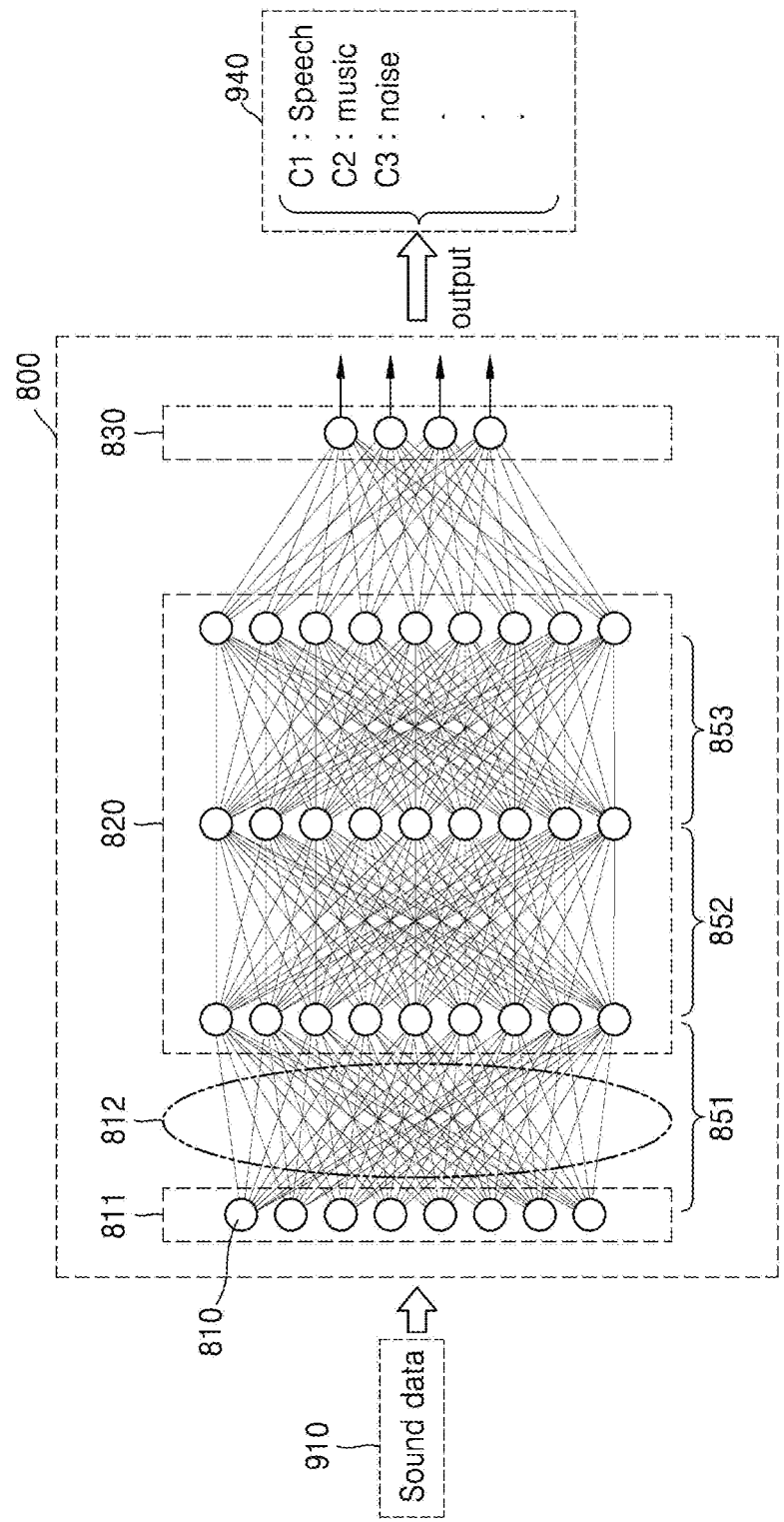
FIG. 9 is another block diagram for explaining a DNN used in a display apparatus according to an example embodiment.

FIG. 9 is another block diagram for explaining a DNN that is used in a display apparatus according to an example embodiment. Components of FIG. 9 that are the same as the components of FIG. 8 are indicated by the same reference numerals or characters.

Referring to FIG. 9, input data (e.g., sound data, text data, etc.) 910 input to the DNN 800 may be data in various forms. In detail, the input data 910 may be a different type of data from image data as illustrated in FIG. 8. For example, the input data 910 may be sound data, text data, or the like. FIG. 9 illustrates a case in which the DNN 800 receives sound data, analyze the received sound data, and outputs a result of classifying the received sound data into at least one class.

Referring to FIG. 9, the DNN 800 may receive the sound data and may analyze the received sound data through the hidden layer 820 included in the DNN 800.

For example, the DNN 800 may output, as output data 940, a result of classifying the received sound data into at least one class or type, for example, speech, music, and noise.

As another example, when the received sound data is voice data uttered by a user, the DNN 800 may analyze the voice data to output a classification result of identifying an individual user who has spoken.

According to an example embodiment, the display apparatus 500 may receive a user voice and identify an individual user from among a plurality of users to provide a customized service to the individual user. In this case, the display apparatus 500 may input the input data 910 corresponding to a voice uttered by the individual user to the DNN 800. Because the voice uttered by the individual user corresponds to personal information of the individual user, the display apparatus 500 may process a necessary operation in the SWD 430 in order to analyze the voice uttered by the individual user.

According to an example embodiment, when the processor 301 seeks to input security data to the neural network 800 and process the input security data, the processor 301 may separate the neural network 800 and drive the neural network 800 in the SWD 430. For example, the processor 301 may control, based on the input data, at least one layer forming the hidden layer 820 from among a plurality of layers constituting the neural network 800 to be driven within the SWD 430. For example, the processor 301 may identify whether the input data (for example, the game image 200) input to the DNN 800 including the plurality of hidden layers 820 between the input layer 811 and the output layer 830 corresponds to security data, and, when the input data is identified as corresponding to the security data, may control the secure OS so that from the input layer 811 of the DNN 800 to at least one hidden layer (for example, at least some of the plurality of hidden layers 820) connected to the input layer 811 are driven within the SWD 430.

Figure 10:
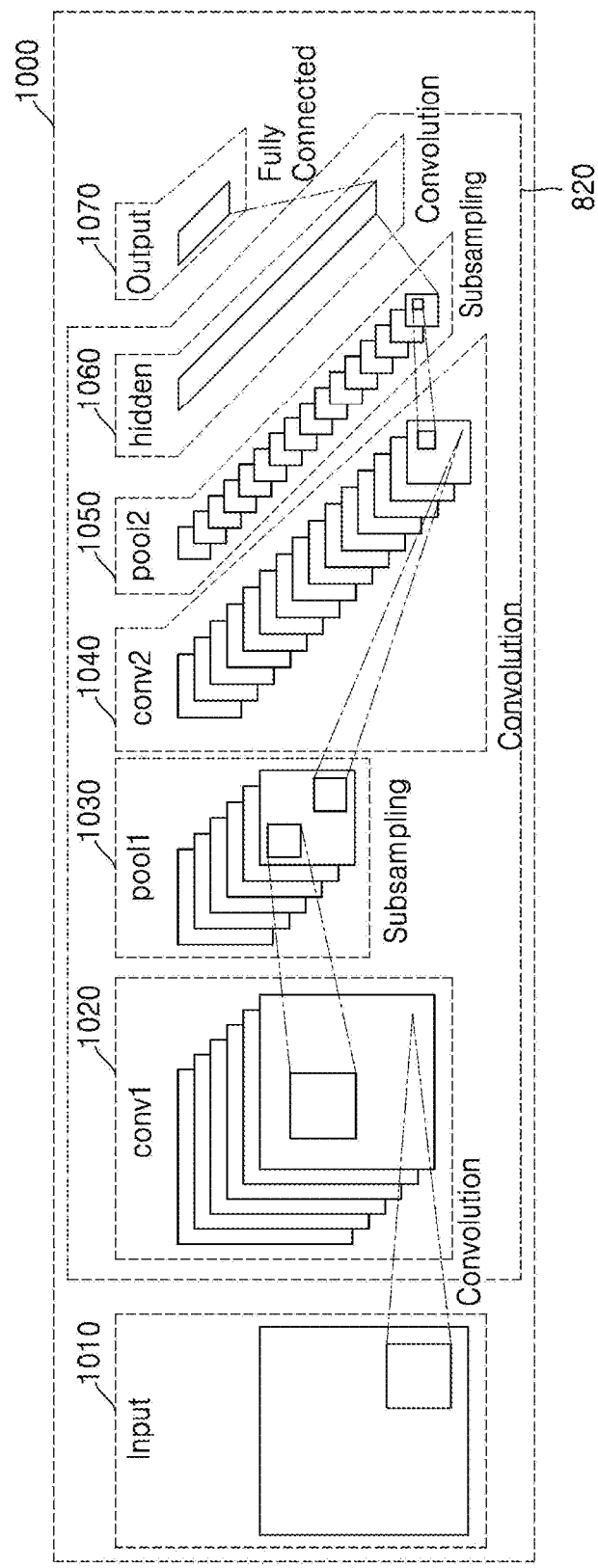
FIG. 10 is another block diagram for explaining a DNN is used in a display apparatus according to an example embodiment.

FIG. 10 is another block diagram for explaining a DNN that is used in a display apparatus according to an example embodiment.

Referring to FIG. 10, a DNN 1000 is an example of a neural network that performs a convolution operation. An input layer 1010, a hidden layer 1020/1060, and an output layer 1070 of FIG. 10 may correspond to the input layer 811, the hidden layer 820, and the output layer 870 of FIGS. 8 and 9, respectively.

FIG. 10 illustrates a CNN-based neural network 1000. For example, FIG. 10 illustrates a Deep Convolution Neural Network (DCNN) 1000 including a plurality of layers to have a plurality of depths.

The CNN-based neural network may introduce the concept of a filter illuminating only a specific region and convolve pieces of information within the filter with each other to create a new expression (feature, feature map or representation), when a correlation between pieces of information included in an image is local.

Referring to FIG. 10, the CNN-based DNN 1000 includes a convolution layer and a pooling layer arranged alternately, and the depth of each layer filter increases from the left to the right. At least one layer forming an output terminal 1070 as a final terminal of the CNN-based DNN 1000 may be formed as a fully connected layer. The convolution layer is a layer of pieces of data created according to a convolution operation, and the pooling layer is a layer for reducing the number or size of data (for example, a feature map) and emphasize specific data through an operation such as sub-sampling or pooling. While passing through the convolution layer and the pooling layer, pieces of data (e.g., a feature map) representing the features of the input image are created. For example, a convolution operation is performed while passing through the convolution layer, and, when the convolution operation is performed, a feature map that more clearly indicates features in an image may be created.

In addition, when the pieces of data generated while passing through the convolution layer and the pooling layer are processed through a hidden layer formed as a fully connected layer, output data corresponding to a desired result may be obtained.

For example, the DNN 1000 may include an input layer 1010, a first convolution layer 1020, a first pooling layer 1030, a second convolution layer 1040, a second pooling layer 1050, a hidden layer hidden layer 1060, and an output layer 870.

For example, layers from one convolution layer to a next convolution layer may correspond to one hidden layer. For example, a first hidden layer may include the first convolution layer 1020 and the first pooling layer 1030, and a second hidden layer may include the second convolution layer 1040 and the second pooling layer 1050. In the example shown in FIG. 10, a subsequent hidden layer 1060 is simplified.

In the DNN 1000, respective depths of the convolution layer and the pooling layer may vary, and a depth of the hidden layer may also vary. As the respective depths of the convolution layer and the pooling layer increase, more various pieces of data may be created. For example, as the respective depths of the convolution layer and the pooling layer increase, pieces of information indicating the features of an input image may have more detailed shapes. The depth and shape of the DNN 1000 may be designed in various ways in consideration of the accuracy of a result, the reliability of the result, the processing speed and capacity of a processor, and the like.

When a DNN receiving input data is a CNN (for example, 800 or 1000) including a plurality of hidden layers, and the input data is identified as corresponding to the security data, the processor 301 may control the secure OS so that from an input layer included in the CNN to at least one hidden layer connected to the input layer from among the plurality of hidden layers are driven in the SWD 430. Accordingly, the processor 301 may control a calculation corresponding to one hidden layer performing a convolution operation for obtaining a feature map to be performed in the SWD 430 at least once. For example, the processor 301 may control a calculation corresponding to one hidden layer (for example, the first hidden layer or the second hidden layer) performing a convolution operation once to be performed in the SWD 430 once or more times. For example, when a DNN includes n hidden layers (here, each of the hidden layers is able to perform a convolution operation one time), the processor 301 may separate the DNN and drive the separated DNN within the SWD 430, so that a calculation corresponding to m hidden layers (where n>m, n and m are natural numbers) from among the n hidden layers is performed within the SWD 430.

Referring back to FIG. 7, in the operation method 700 of the display apparatus, when the input data is identified as corresponding to the security data, the secure OS may be controlled so that from the input layer (for example, 1010) to at least one hidden layer connected, directly or indirectly, to the input layer from among the plurality of hidden layers (for example, 820) constituting the DNN (for example, 1000) are driven within the SWD 430 (S720). For example, the control may be performed by the processor 301. For example, operation S720 may be performed by the processor 301.

In the operation method 700 of the display apparatus, when the input data is identified as not corresponding to the security data, the normal OS may be controlled so that the entire DNN (for example, 1000) is driven in a world other than the SWD 430 (S730). For example, the control may be performed by the processor 301. For example, operation S730 may be performed by the processor 301.

Referring back to FIG. 10, the processor 301 may control a calculation corresponding to from the input layer 1010 to one hidden layer connected, directly or indirectly, to the input layer 1010 (for example, the first hidden layer including the first convolution layer 1020 and the first pooling layer 1030) to be performed within the SWD 430. A calculation corresponding to layers after the first hidden layer may be controlled to be performed in the NWD 410.

As another example, the processor 301 may control a calculation corresponding to from the input layer 1010 to two hidden layers connected, directly or indirectly, to the input layer 1010 (for example, the first hidden layer including the first convolution layer 1020 and the first pooling layer 1030 and the second hidden layer including the second convolution layer 1040 and the second pooling layer 1050) to be performed within the SWD 430. A calculation corresponding to layers after the second hidden layer may be controlled to be performed in the NWD 410.

The DNN separation and driving operation will now be described in more detail with reference to FIG. 11.

Figure 11:
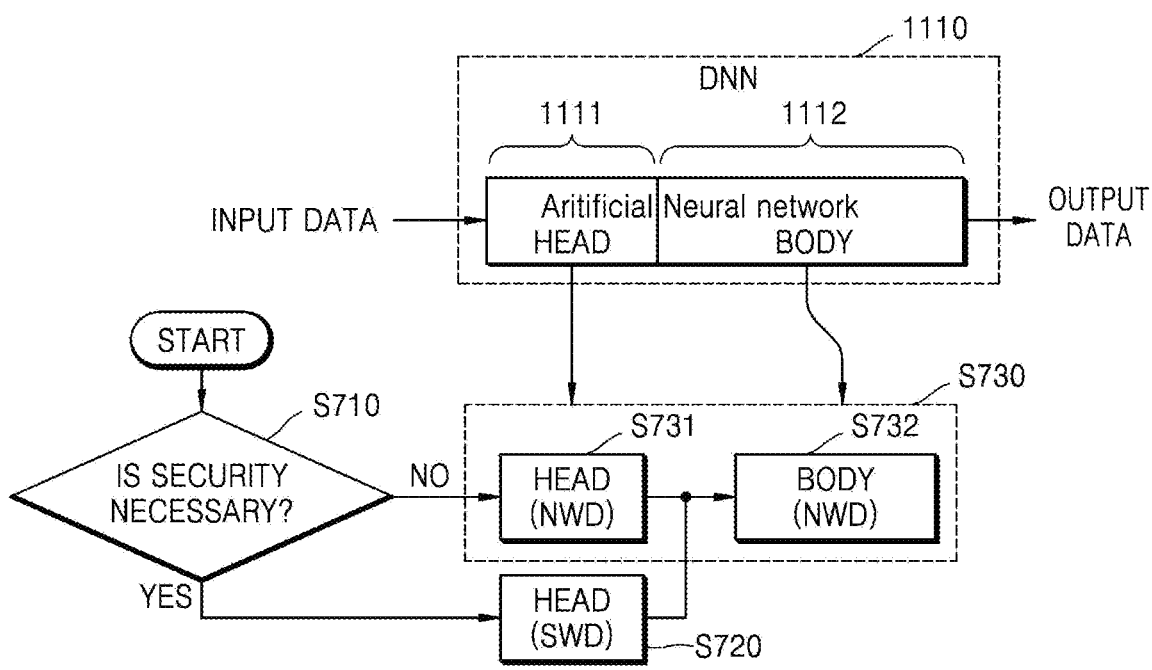
FIG. 11 is a view for explaining an operation performed by a display apparatus according to an example embodiment.

FIG. 11 is a view for explaining an operation performed by a display apparatus according to an example embodiment. Components of FIG. 11 that are the same as the components of FIG. 7 are indicated by the same reference numerals or characters.

A DNN 1110 of FIG. 11 corresponds to the DNN 800 or 1000 described above with reference to FIGS. 8 through 10. The DNN 1110 may receive input data, and may output, as output data, a result generated by performing a calculation according to a neural network with respect to the received input data.

For convenience of explanation, in the DNN 1110, an input layer receiving the input data to at least one hidden layer from among a plurality of hidden layers are referred to as a HEAD part 1111, and from a layer subsequent to the HEAD part 1111 to an output layer re referred to as a BODY part 1112.

For example, when the DNN 1000 of FIG. 10 and the DNN 1110 of FIG. 11 are compared with each other, from the input layer 1010 to a first hidden layer (for example, the first hidden layer including the first convolution layer 1020 and the first pooling layer 1030 may correspond to the HEAD part 1111, and from a second hidden layer (for example, the second hidden layer including the second convolution layer 1040 and the second pooling layer 1050) to the output layer 1070 may correspond to the BODY part 1112. As another example, layers from the input layer 1010 to the second hidden layer (for example, the second hidden layer including the second convolution layer 1040 and the second pooling layer 1050) may correspond to the HEAD part 1111, and layers from a subsequent terminal of the second hidden layer (for example, at least one subsequent hidden layer 1060) to the output layer 1070 may correspond to the BODY part 1112.

Referring to FIG. 11, in the operation method 700 of the display apparatus, when security processing for the input data is required, namely, when the input data is identified as the security data (S710), the HEAD part 1111 of the DNN 1110 may operate in the SWD providing a TEE (S720).

In the operation method 700 of the display apparatus, when security processing for the input data is not required, namely, when the input data is not identified as the security data (S710), the HEAD part 1111 and the BODY part 1112 of the DNN 1110 may operate in the NWD providing an REE (S730). In detail, in the operation method 700 of the display apparatus, when security processing is not required (S710), the HEAD part 1111 of the DNN 1110 may operate in the NWD providing an REE (S731), and the BODY part 1112 may also operate in the NWD providing an REE (S732).

Figure 12:
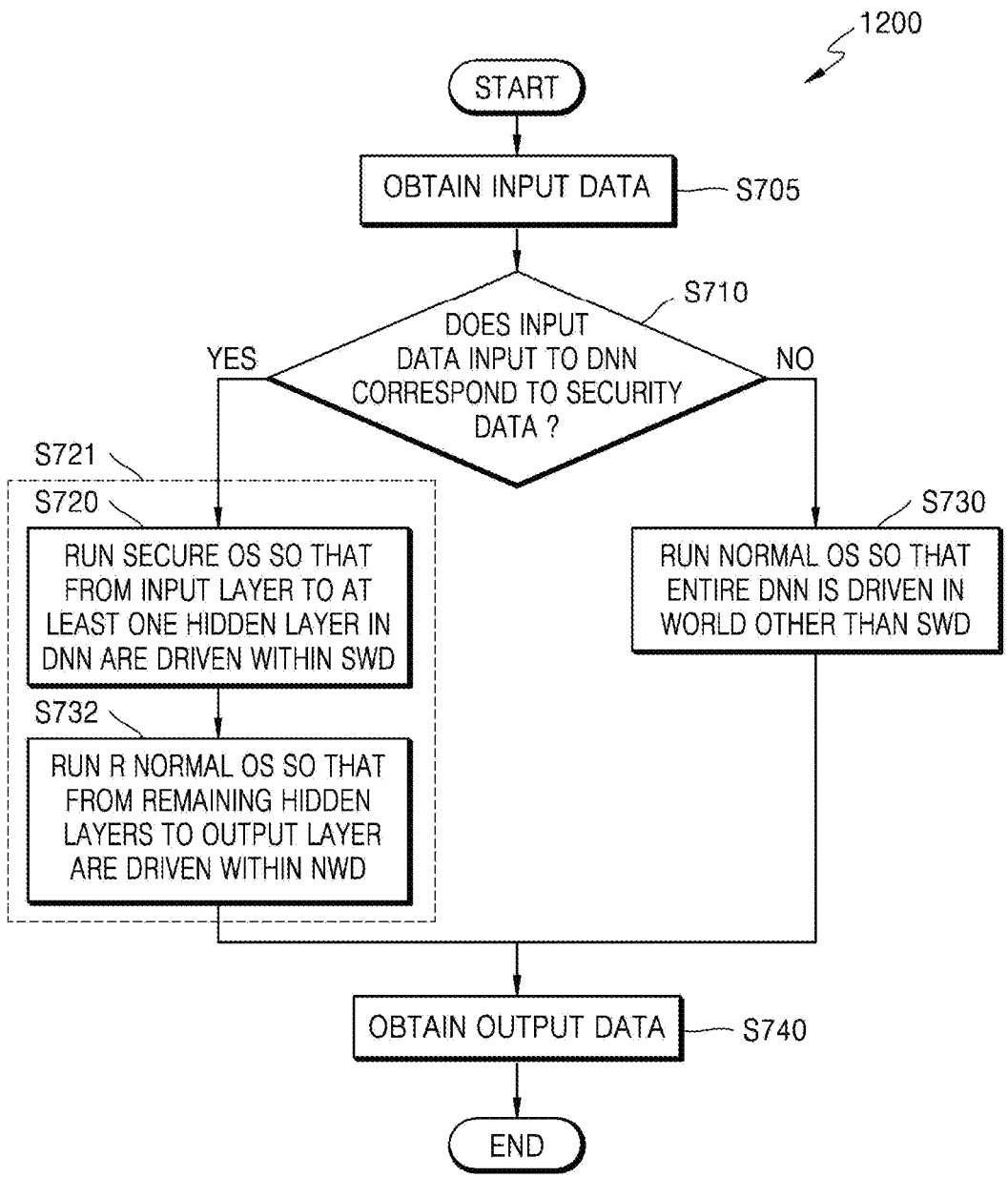
FIG. 12 is another flowchart of an operation method of a display apparatus, according to an example embodiment.

FIG. 12 is another flowchart of an operation method of a display apparatus, according to an example embodiment. An operation method 1200 of a display apparatus of FIG. 12 may be a flowchart illustrating operations performed by the display apparatus 100, 300, 500 or 600 according to an example embodiment described above with reference to FIGS. 1 through 11. Components of the operation method 1200 of the display apparatus that are the same as those shown in FIGS. 7 and 11 are illustrated using the same reference numerals or characters. Accordingly, descriptions of the operation method 1200 of the display apparatus that are the same as those made with reference to FIGS. 1 through 11 are not repeated herein.

A case in which the operation method 1200 of the display apparatus is performed by the display apparatus 500 of FIG. 5 will now be illustrated and described.

Referring to FIG. 12, in the operation method 1200 of the electronic device, input data to be received and processed by the DNN may be obtained (S705). For example, operation 5705 may be performed by the data obtainer 305. In detail, for example, operation 5705 may be performed by the data obtainer 305 under the control by the processor 301.

In the operation method 1200 of the display apparatus, operation 5720 or 5730 is performed according to a result of determining whether the input data obtained in operation 5710 corresponds to the security data.

In the operation method 1200 of the display apparatus, output data output from the output layer of the DNN may be obtained according to a result of operation 5720 or 5730 (S740).

Referring to FIGS. 11 and 12, when the input data is identified as corresponding to the security data, the secure OS may be controlled so that from the input layer in the DNN to the at least one hidden layer in the DNN, for example, to the HEAD part 1111, are driven in the SWD 430 (S720). In detail, the processor 301 may control the secure OS to drive the HEAD part 1111 of the DNN to be driven within the SWD 430.

Subsequent to operation 5720, the normal OS may be controlled to drive the rest of the DNN (for example, the BODY part 1112 which is a part of the DNN excluding the HEAD part 1111) within the NWD 410 (S732). In detail, the processor 301 may control the normal OS to drive the BODY part 1112 of the DNN to be driven within the NWD 410.

In the operation method 1200 of the display apparatus, when the input data is not identified as corresponding to the security data (S710), the entirety of the DNN 1110, namely, both the HEAD part 1111 and the BODY part 1112, may operate in the NWD providing an REE (S730).

Referring back to FIGS. 8 through 10, when the input data is input to and processed by the DNN 800 or 1000, pieces of feature data (for example, a feature map) may be created every time the input data passes through the plurality of hidden layers formed in the DNN. For example, first feature data pieces may be created while the input data is passing through the first hidden layer, and second feature data pieces different from the first feature data pieces may be created while the input data is passing through the second hidden layer. For example, as the input data passes through the layers in the DNN, namely, the plurality of hidden layers in the DNN, the input data may be expressed more abstractly. In addition, as the input data passes through the layers in the DNN, namely, the plurality of hidden layers in the DNN, the degree of deformation from the input data tends to increase.

Feature data generated while the input data is passing through a hidden layer is different from the input data, and the feature data may have an irreversible feature. For example, a convolution layer, a pooling layer, and/or an activation function forming the hidden layer may generally be an irreversible operation. For example, the input data may not be restored from feature data generated by passing through the hidden layer, which is data obtained by performing an irreversible operation. Thus, the input data may not be restored from intermediate production data of each of the plurality of hidden layers included in the DNN 800 or 1000.

For example, data output through the aforementioned HEAD part 1111 may be data irreversibly deformed from input data that is original data. Therefore, even when the data output from the last end of the HEAD part 1111 is stolen, it is impossible to restore the original data.

According to an example embodiment, even when the entirety of the DNN 800 or 1000 is not driven in the SWD, namely, even when only some of the hidden layers included in the DNN are driven in the SWD, the input data may not be restored based on an intermediate product (for example, pieces of feature data output by the hidden layer) created in at least one hidden layer driven in the SWD. Accordingly, the risk of hacking in which the input data is stolen may be removed when the input data is processed. Moreover, because the rest of the DNN is operated in the NWD, insufficient resources in the SWD when the entire DNN is driven in the SWD may be addressed.

A DNN separation and driving operation will now be described in more detail with reference to FIGS. 13 through 15.

Figure 13:
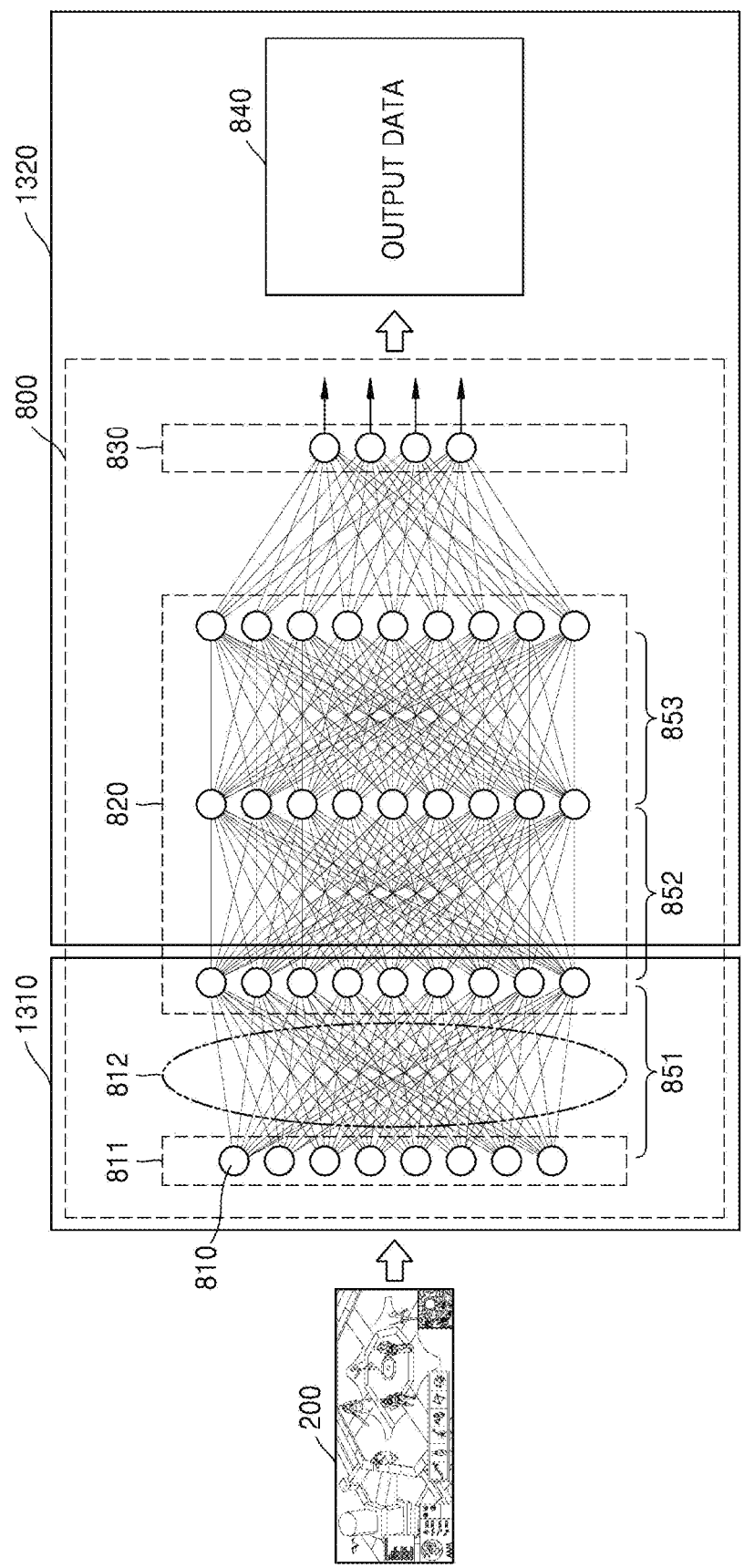
FIG. 13 is a view for explaining an example of a DNN separation and driving operation performed by a display apparatus according to an example embodiment.

FIG. 13 is a view for explaining an example of a DNN separation and driving operation performed by a display apparatus according to an example embodiment.

Figure 14:
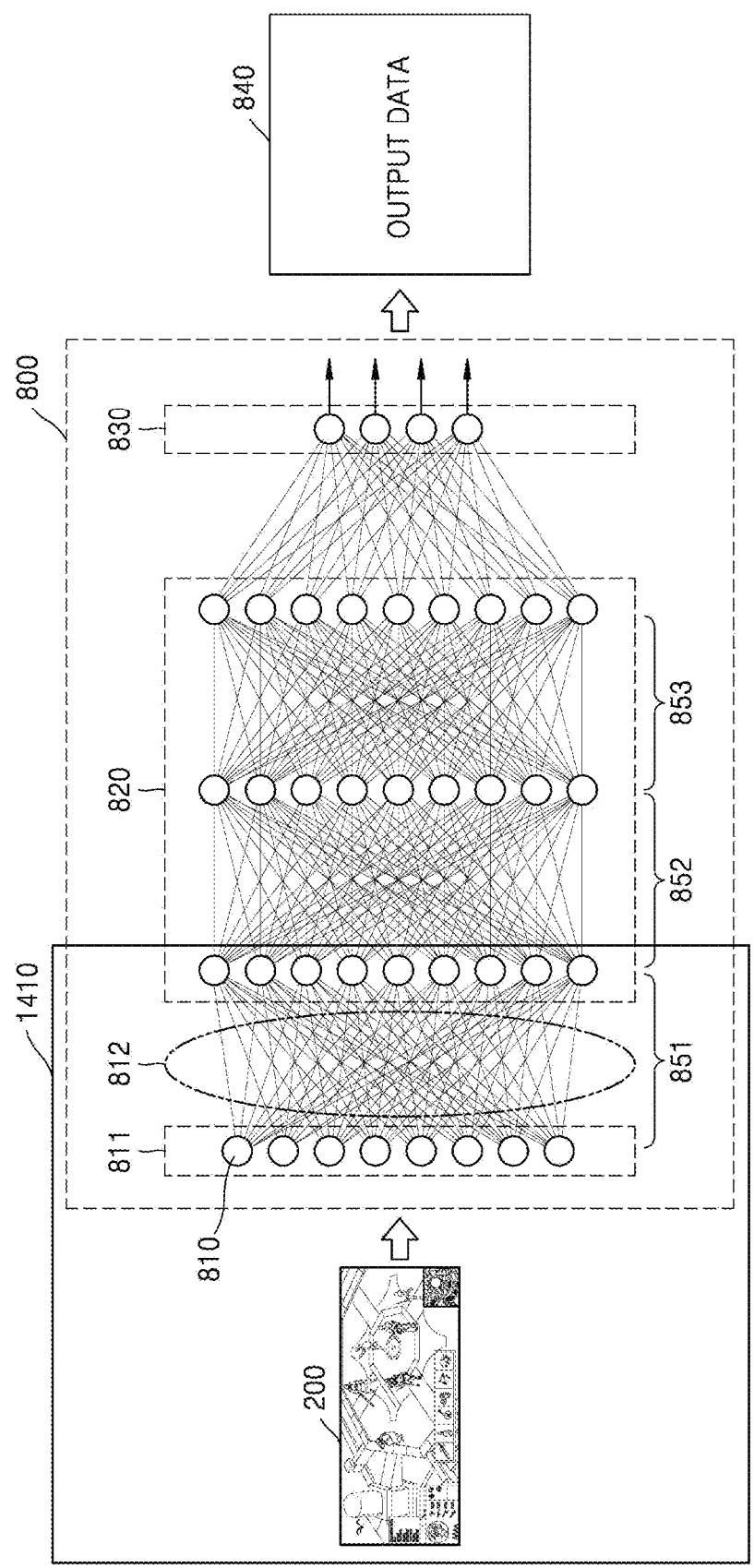
FIG. 14 is a view for explaining another example of a DNN separation and driving operation performed by a display apparatus according to an example embodiment.

FIG. 14 is a view for explaining another example of a DNN separation and driving operation performed by a display apparatus according to an example embodiment.

Components of FIGS. 13 and 14 that are the same as the components of FIGS. 8 and 9 are indicated by the same reference numerals or characters. A description of FIGS. 13 and 14 that is the same as given above with reference to FIG. 8 will not be repeated herein.

According to an example embodiment, only a part of a DNN may be separated and driven in the SWD, based on input data.

Referring to FIGS. 11 and 13, the HEAD part 1111 including an input part of the DNN of FIG. 11 and the BODY part 1112, which is the rest of the DNN subsequent to the HEAD part 1111, may correspond to neural network components included in a block 1310 of FIG. 13 and neural network components included in a block 1320 of FIG. 13, respectively.

Referring to FIG. 13, the display apparatus may drive from the input layer 811 of the DNN 800 receiving the game image 200, which is input data, to at least one hidden layer in the SWD 430, and may drive the rest of the DNN 800 in the NWD 410.

FIG. 13 illustrates a case in which a hidden layer driven in the SWD 430 is one hidden layer and a case in which a calculation from the input layer 811 to the first hidden layer 851 is performed in the SWD 430. The number of hidden layers driven in the SWD 430 may vary. For example, a calculation from the input layer 811 to the second hidden layer 852 may be performed in the SWD 430, or a calculation from the input layer 811 to the third hidden layer 853 may be performed in the SWD 430.

As described above, the display apparatus may obtain an intermediate product (or intermediate production data) output by the first hidden layer 851 within the SWD 430, by driving only the HEAD part of the DNN 800 within the SWD 430. The processor 301 may drive neural network components included in the block 1320, which is the rest of the DNN 800, by transmitting the intermediate product created in the SWD 430 to the NWD 410. Accordingly, a calculation corresponding to the components included in the block 1320, which is the rest of the DNN 800, may be performed in the NWD 410. Thus, the result data 840 may be obtained within the NWD 410.

Components of FIG. 14 that are the same as those of FIGS. 8 and 13 are illustrated using the same reference numerals, and descriptions thereof will not be repeated herebelow.

Referring to FIG. 14, the display apparatus 500 according to an example embodiment may obtain input data itself within the SWD 430. The display apparatus 500 may drive from the input layer 811 of the DNN 800 receiving the game image 200, which is the obtained input data, to at least one hidden layer in the SWD 430, and may drive the rest of the DNN 800 in the NWD 410. In detail, the display apparatus 500 may perform processing corresponding to the block 1410 within the SWD 430.

The operation of obtaining the input data within the SWD 430 will now be described in detail with reference to FIG. 15.

Figure 15:
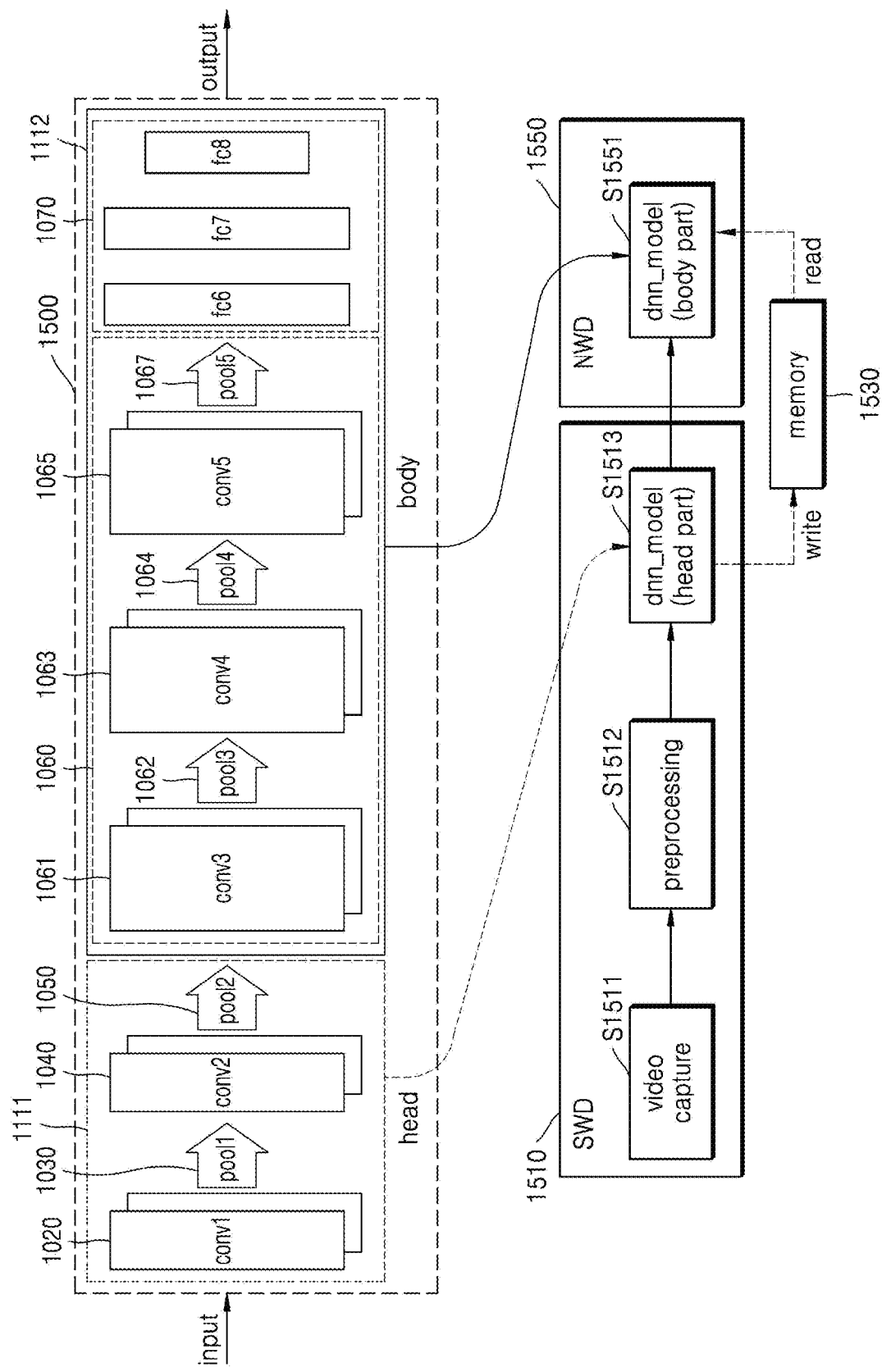
FIG. 15 is a view for explaining another example of a DNN separation and driving operation performed by a display apparatus according to an example embodiment.

FIG. 15 is a view for explaining another example of a DNN separation and driving operation performed by a display apparatus according to an example embodiment. Components of FIG. 15 that are the same as those of FIGS. 10 and 11 are illustrated using the same reference numerals, and thus descriptions thereof will not be repeated herebelow.

The DNN 1000 of FIG. 15 may correspond to the DNN 1000 of FIG. 10, and more briefly illustrates layers.

FIG. 15 illustrates a case in which the DNN 1000 includes five hidden layers and each of the five hidden layers includes convolution layers (for example, 1020, 1040, 1061, 1063, and 1065). For example, in the DNN 1000, the first hidden layer may include the first convolution layer 1020 and the first pooling layer 1030, the second hidden layer may include the second convolution layer 1040 and the second pooling layer 1050, a third hidden layer may include a third convolution layer 1061 and a third pooling layer 1062, a fourth hidden layer may include a fourth convolution layer 1063 and a fourth pooling layer 1064, and a fifth hidden layer may include a fifth convolution layer 1065 and a fifth pooling layer 1067. The output layer 1070 may be formed to be fully connected, and may be a layer deriving a result from pieces of feature data output from the hidden layer 1060.

In FIG. 15, the processor 301 may drive the HEAD part 1111 of the DNN 1000 including the first hidden layer and the second hidden layer, within the SWD 430. The processor 301 may drive the BODY part 1112, which is the rest of the DNN 1000, in the NWD 410.

In FIG. 15, a block 1510 may represent operations performed in the SWD providing a TEE, and a block 1550 may represent an operation performed in an NWD providing a REE.

Referring to FIG. 15, an input data obtaining operation corresponding to operation 5705 may be performed in the SWD. For example, when the input data is the user image described above with reference to FIG. 1, a video capture operation S1511 may be performed to obtain the user image, and the obtained user image may be preprocessed (S1512). For example, the preprocessing may include an operation of de-noising an obtained image. Next, the preprocessed user image may be input to a head part ('dnn_model(head part)') of a DNN and a calculation corresponding to the DNN may be performed (S1513).

For example, an intermediate product created in the SWD (for example, pieces of feature data output by the HEAD part 1111 of the DNN) may be transmitted to and stored in a memory 1530 that is shared between the SWD and the NWD. The intermediate product stored in the memory 1530 may be read and input to the input terminal of the BODY body 1112 of the DNN driven in the NWD. Thus, the BODY part 1112 of the DNN may receive the intermediate product and may perform a calculation corresponding to at least one hidden layer and an output layer that constitute the BODY part 1112 (S1551).

Figure 16:
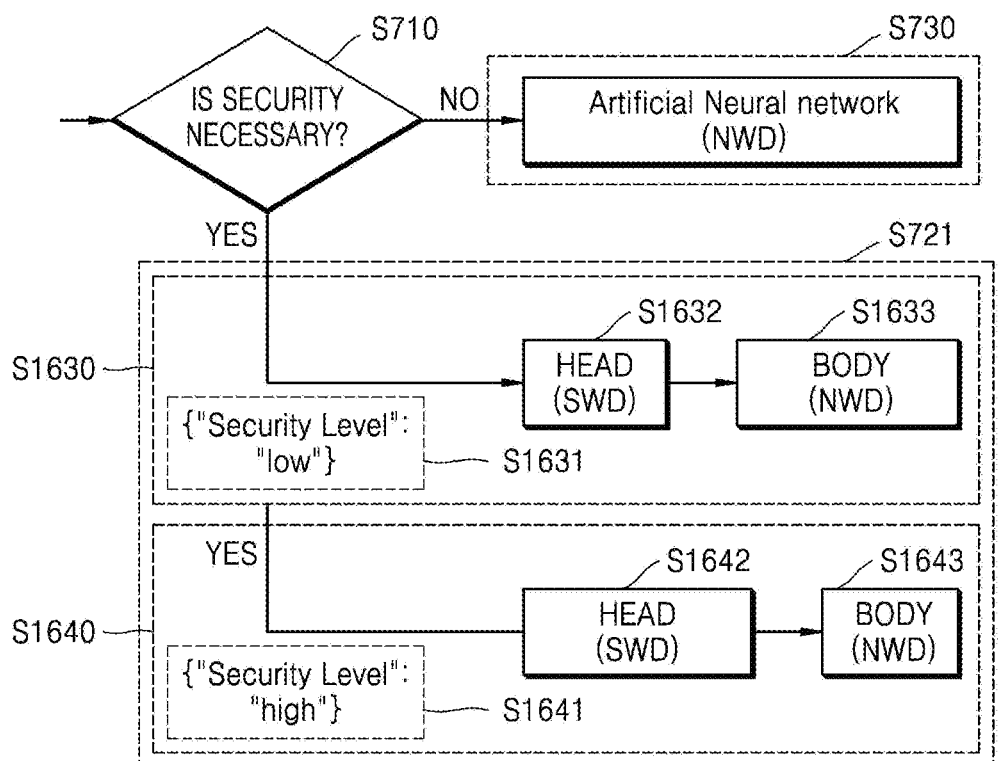
FIG. 16 is another diagram for explaining an operation performed by a display apparatus according to an example embodiment.

FIG. 16 is another diagram for explaining an operation performed by a display apparatus according to an example embodiment. Components of FIG. 16 that are the same as the components of FIG. 11 are indicated by the same reference numerals or characters. Thus, a repeated description thereof will be omitted.

According to an example embodiment, when the input data is identified as corresponding to the security data (S710—YES), the processor 301 may differently set the depth of the at least one hidden layer driven in the SWD, based on at least one of the type or characteristics of the input data. For example, the type of input data may be classified into copyrighted content, user input data, a user image, and the like. Alternatively, the characteristics of the input data may include information indicating whether DRM encryption or HDCP exists in the input data.

For example, the processor 301 may set a security level, based on at least one of the type or characteristics of the input data. The processor 301 may differently set the depth of the at least one hidden layer driven in the SWD, based on the security level.

For example, based on at least one of the type or characteristics of the input data, the processor 301 may set the security level to be high, when security necessity increases, and may set the security level to be low, when security necessity decreases.

For example, the processor 301 may differently set the security level according to whether DRM encryption has been applied to the input data. For example, first input data to which DRM encryption has not been applied and second input data to which DRM encryption has been applied may correspond to a first security level (for example, security level=low) and a second security level (for example, security level=high), respectively. In the above-described case, the processor 301 may control the depth of the at least one hidden layer driven in the SWD to be a first depth, in the DNN receiving the first input data to which DRM encryption has not been applied. In addition, the processor 301 may control the depth of the at least one hidden layer driven in the SWD to be a second depth higher than the first depth, in the DNN receiving the second input data to which DRM encryption has been applied. Here, when the depth of a hidden layer is high, it may indicate that more hidden layers are included. For example, when one hidden layer is included, a depth may be considered 1, and, when two hidden layers are included, a depth may be considered 2.

For example, when the depth of a hidden layer increases in a DNN, this may indicate that the number of steps of hidden layers of the DNN increases.

In the DNN, the degree of abstraction may increase as the hidden layers increase. For example, an intermediate product created by passing through the first hidden layer has a higher degree of deformation than an intermediate product created by sequentially passing through the first hidden layer and the second hidden layer, and thus is created in a more abstract expression. The degree of abstraction increasing may indicate that data is created with more irreversible characteristics. As the degree of deformation increases, it may become difficult to restore the original data based on the intermediate product. Accordingly, as the depth of the hidden layer driven in the SWD increases, the degree of security for input data may be increased. Thus, as security necessity for the input data increases, the processor 301 may set the security level so that the depth of the hidden layer driven in the SWD increases.

FIG. 16 illustrates a case in which the set security level is composed of two steps, which are security level=low and security level=high.

Referring to FIG. 16, when security processing for the input data is not required, namely, when the input data is not identified as the security data (S710-NO), the processor 301 may drive the entirety of the DNN (for example, 800, 1000, or 1110) in the NWD providing an REE (S730). In detail, calculations corresponding to the entirety of the DNN (for example, 800, 1000, or 1110) may be all performed in the NWD.

When security processing for the input data is required (S710—YES), the processor 301 may separate the DNN (for example, 800, 1000, or 1110) and drive the separated DNN in the SWD (S721). For example, the processor 301 may differently set a part (for example, a head part) of the DNN (for example, 800, 1000, or 1110) that is driven in the SWD according to the security level.

FIG. 16 illustrates a case in which the security level is divided into two levels. For example, referring to operation S1640, when a security level corresponding to the input data is high (S1641), the processor 301 may separate and drive the DNN (for example, 800, 1000, or 1110) in the SWD so that a depth from an input layer of the DNN (for example, 800, 1000, or 1110 is the first depth (S1642). The rest of the DNN (for example, 800, 1000, or 1110) excluding a part having the first depth may operate in the NWD (S1643).

For example, referring to operation S1640, when a security level corresponding to the input data is high (security level =high) (S1641), the processor 301 may separate and drive the DNN (for example, 800, 1000, or 1110) in the SWD so that a depth from an input layer of the DNN (for example, 800, 1000, or 1110 is the first depth (S1642). The rest of the DNN (for example, 800, 1000, or 1110) excluding a part having the first depth may operate in the NWD (S1643).

For example, referring to operation S1630, when the security level corresponding to the input data is low (security level =low) (S1631), the processor 301 may separate and drive the DNN (for example, 800, 1000, or 1110) in the SWD so that a depth from the input layer of the DNN (for example, 800, 1000, or 1110 is the second depth (S1632). The rest of the DNN (for example, 800, 1000, or 1110) excluding a part having the second depth may operate in the NWD (S1633). The second depth may have a smaller value than the first depth. For example, when the security level is high (S1641), a part from the input layer to the third hidden layer in the DNN (for example, 800, 1000, or 1110) may be driven in the SWD, and, when the security level is low (S1631), a part from the input layer to the first hidden layer in the DNN (for example, 800, 1000, or 1110) may be driven in the SWD.

Figure 17:
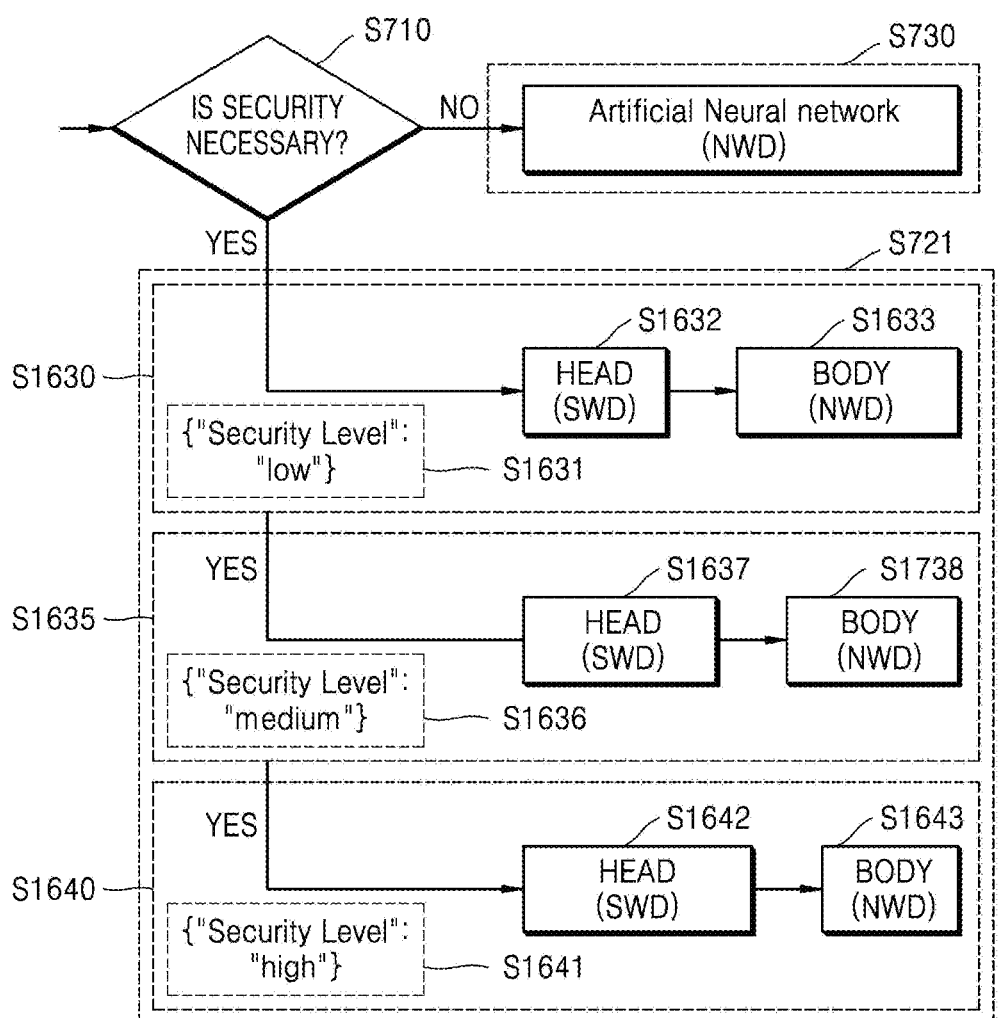
FIG. 17 is another diagram for explaining an operation performed by a display apparatus according to an example embodiment.

FIG. 17 is another diagram for explaining an operation performed by a display apparatus according to an example embodiment. Components of FIG. 17 that are the same as those of FIG. 16 are illustrated using the same reference numerals, and thus descriptions thereof will not be repeated herebelow.

Compared with FIG. 16, FIG. 17 illustrates a case in which the security level is divided into three levels. For example, security level=medium may further exist in addition to security level=low and security level=high described above with reference to FIG. 16.

Referring to operation S1640, when a security level corresponding to the input data is high (security level=high) (S1641), the processor 301 may separate and drive the DNN (for example, 800, 1000, or 1110) in the SWD so that a depth from an input layer of the DNN (for example, 800, 1000, or 1110 is the first depth (S1642). The rest of the DNN (for example, 800, 1000, or 1110) excluding a part having the first depth may operate in the NWD (S1643).

Referring to operation S1635, when the security level corresponding to the input data is medium (security level=medium) (S1636), the processor 301 may separate and drive the DNN (for example, 800, 1000, or 1110) in the SWD so that a depth from the input layer of the DNN (for example, 800, 1000, or 1110 is the second depth (S1637). The rest of the DNN (for example, 800, 1000, or 1110) excluding a part having the second depth may operate in the NWD (S1638).

Referring to operation S1630, when the security level corresponding to the input data is low (security level=low) (S1631), the processor 301 may separate and drive the DNN (for example, 800, 1000, or 1110) in the SWD so that a depth from the input layer of the DNN (for example, 800, 1000, or 1110 is the third depth (S1632). The rest of the DNN (for example, 800, 1000, or 1110) excluding a part having the third depth may operate in the NWD (S1633).

In FIG. 17, the third depth may have a smaller value than the second depth, and the second depth may have a smaller value than the first depth. In other words, the first depth<the second depth<the third depth may be established. For example, when the security level is high (security level=high) (S1641), a part from the input layer to the third hidden layer in the DNN (for example, 800, 1000, or 1110) may be driven in the SWD, and, when the security level is medium (security level=medium) (S1636), a part from the input layer to the second hidden layer in the DNN (for example, 800, 1000, or 1110) may be driven in the SWD.

When the security level is low (security level=low) (S1631), a part from the input layer to the first hidden layer in the DNN (for example, 800, 1000, or 1110) may be driven in the SWD.

Figure 18:
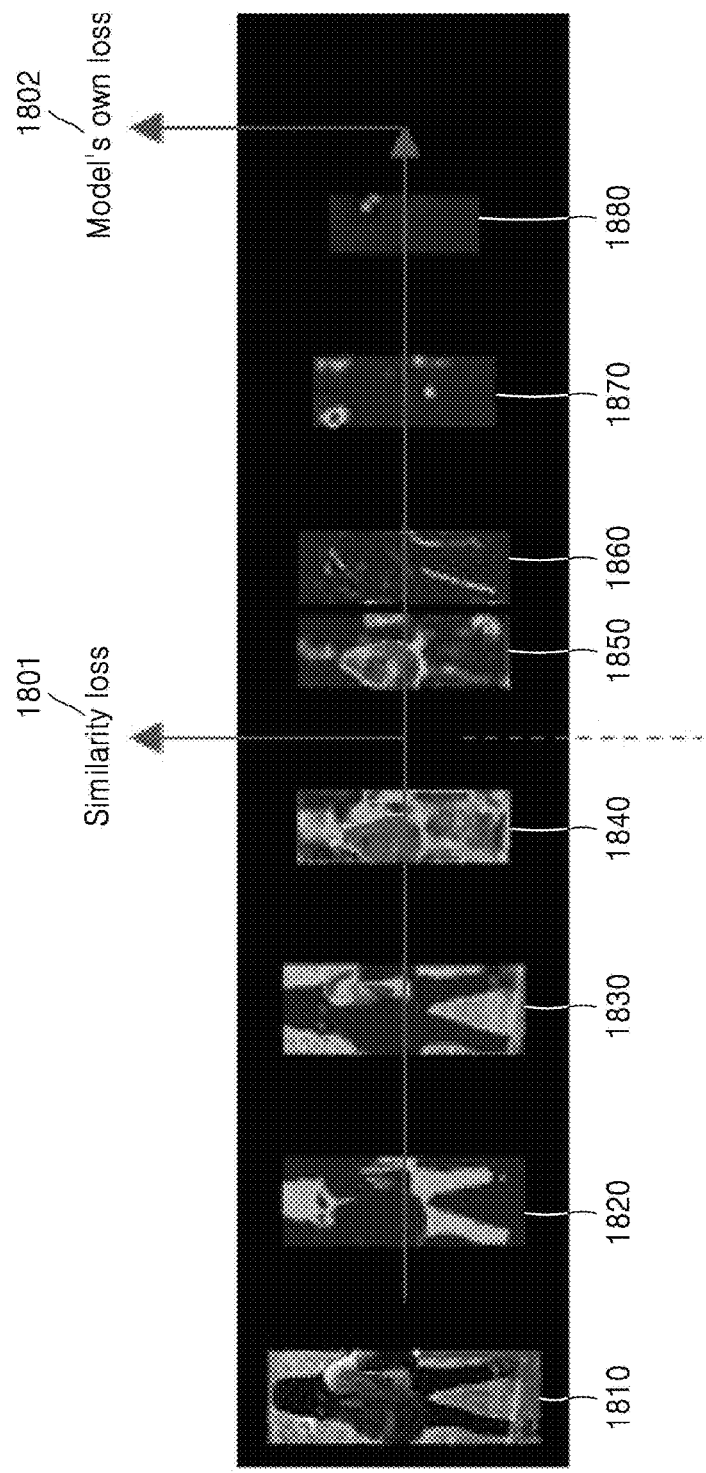
FIG. 18 is another view for explaining a DNN used in a display apparatus according to an example embodiment.

FIG. 18 is another view for explaining a DNN that is used in a display apparatus according to an example embodiment.

FIG. 18 illustrates an intermediate product created in each layer included in the DNN (for example, 800, 1000, or 1110).

For example, input data 1810 may be input to the DNN (for example, 800, 1000, or 1110). As the input data 1810 passes through the layers included in the DNN (for example, 800, 1000, or 1110, in detail, as the input data 1810 passes through a hidden layer, the degree of abstraction of the input data 1810 may increase.

For example, the DNN (for example, 800, 1000, or 1110) may be a neural network that receives an image and recognizes an object included in the image. For example, the DNN (for example, 800, 1000, or 1110) may receive an image and may output, as output data, information indicating that a 'female person' is included in the image.

Referring to FIG. 18, an intermediate product 1820 created by passing through the first hidden layer, an intermediate product 1830 created by passing through the second hidden layer, an intermediate product 1840 created by passing through the third hidden layer, an intermediate product 1850 created by passing through the fourth hidden layer, an intermediate product 1860 created by passing through the fifth hidden layer, and an intermediate product 1870 created by passing through the sixth hidden layer, and an intermediate product 1880 created by passing through the sixth hidden layer are sequentially illustrated. As the depth of the DNN through which an image 1810, which is the input data 1810, increases, the degree of deformation or the degree of abstraction of an intermediate product may increase.

For example, the processor 301 may set the depth of the at least one hidden layer driven in the SWD, based on a deformation degree between each of a plurality of intermediate products respectively output by a plurality of hidden layers included in the DNN and the input data.

For example, the processor 301 may set the depth of the at least one hidden layer driven in the SWD, based on whether the deformation degree between each of the plurality of intermediate products respectively output by the plurality of hidden layers included in the DNN and the input data is equal to or greater than a certain value.

For example, the deformation degree may be calculated based on a similarity between input data and an intermediate product. For example, the deformation degree may be obtained based on a value indicating a similarity or quality difference between a converted image and the original image, such as a structural similarity index measure (SSIM) or a peak signal-to-noise ratio (PSNR). For example, the deformation degree is a value calculated based on the value of the SSIM, the PSNR, or the like, and may be a value indicating a low degree of similarity to input data.

For example, the processor 301 may calculate the deformation degree between each of the plurality of intermediate products respectively output by the plurality of hidden layers included in the DNN and the input data, and may control from the input layer to a hidden layer outputting an intermediate product of which deformation degree is equal to or greater than a certain limit value to be driven in the SWD. For example, when the deformation degree of the intermediate product 1830 created by passing through the third hidden layer is equal to or greater than the certain limit value, the processor 301 may perform a calculation corresponding to layers from the input layer to the third hidden layer in the SWD, and may perform a calculation corresponding to layers from the fourth hidden layer to the output layer in the NWD.

As another example, the processor 301 may set the depth of the at least one hidden layer driven in the SWD, based on a deformation degree increase rate between the plurality of intermediate products respectively output by the plurality of hidden layers included in the DNN.

For example, when the deformation degree of the intermediate product created by passing through the third hidden layer increases the most, the processor 301 may perform a calculation corresponding to layers from the input layer to the third hidden layer in the SWD, and may perform a calculation corresponding to layers from the fourth hidden layer to the output layer in the NWD. The deformation degree increase rate being large may indicate that, when passing through a corresponding hidden layer, the input data has a greatly-increased deformation degree and thus irreversibility increases. Thus, the increase in the irreversibility of the input data may make it more difficult to restore the input data by using an intermediate product created in the corresponding hidden layer. Therefore, according to an example embodiment, based on the deformation degree increase rate, a DNN may be separated and driven with respect to a hidden layer of which the deformation degree increase rate increases beyond a limit value.

In addition, in order to increase security performance, training of the DNN may be performed in a direction in which the degree of deformation of an intermediate product corresponding to a part of the DNN that is driven in the SWD increases.

For example, the processor 301 may train the DNN so that a deformation degree between an intermediate product output by at least one hidden layer driven in the SWD and input data increases.

For example, the DNN (for example, 800, 1000, or 1110) may be trained in a direction of improving a deformation degree of each layer of the DNN (for example, 800, 1000, or 1110), based on a loss function.

For example, an arbitrary layer may be selected in a training stage of the DNN (for example, 800, 1000, or 1110), and a deformation degree of the arbitrary layer may be additionally reflected in the loss function. In this case, the arbitrary layer may be provided in plural. For example, the degree of deformation of a corresponding layer may correspond to a similarity loss 1801 corresponding to an intermediate product, and the degree of deformation of the entire DNN may correspond to a Model's own loss 1802 of the model of a final output layer. Loss, which is the loss function corresponding to the degree of deformation of the corresponding layer included in the DNN, may be expressed as Loss=(Model's own loss)(1802)+similarity loss(1801).

As another example, in a training-completed DNN (for example, 800, 1000, or 1110), each of the plurality of hidden layers may be additionally re-trained (tuned). A part of the tuned DNN may be separated and driven in the SWD. For example, the degree of deformation of each layer may be first calculated, and then a layer having a high degree of deformation may be selected. The loss function of the DNN may be designed so that a result of evaluating a deformation degree between an output (for example, an intermediate result) of the selected layer and the input data input data is reflected. Therefore, the degree of deformation may be made considered during back propagation for the DNN. Moreover, at the completion of training, a final evaluation score for each layer may be stored as a data table, and may be used to designate a head part to be driven in the SWD.

As described above, in the training stage of the DNN, when training is performed so that the degree of deformation is increased based on the loss function of each stage, the irreversibility of an intermediate product generated in a hidden layer driven in the SWD may be increased. Accordingly, security performance may be further increased.

Figure 19:
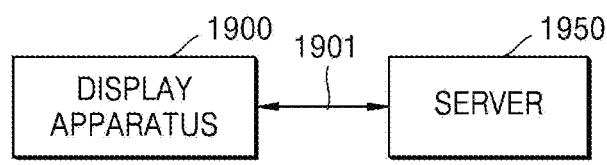
FIG. 19 is a block diagram of a server device that communicates with a display apparatus according to an example embodiment.

FIG. 19 is a block diagram of a server device that communicates with a display apparatus according to an example embodiment. A display apparatus 1900 of FIG. 19 may correspond to the display apparatus 100, 300, 500, or 600 according to an example embodiment described above with reference to FIGS. 1 through 18.

Referring to FIG. 19, the display apparatus 1900 and a server 1950 may be connected, directly or indirectly, to each other via a communication network 1901, and the display apparatus 1900 may be connected, directly or indirectly, to the communication network 1901 via an internally-included communication interface (for example, the communication interface 360 of FIG. 5).

The server 1950 may perform a calculation according to a neural network. For example, the server 1950 may store the neural network (or an AI model corresponding to the neural network), and may drive the neural network. As a result of performing a calculation according to the neural network, the display apparatus 1900 and the server 1950 may transmit or receive an AI model obtained by training the neural network, data necessary for training the AI model, and data required for the AI model to output a result, and the like.

Figure 20:
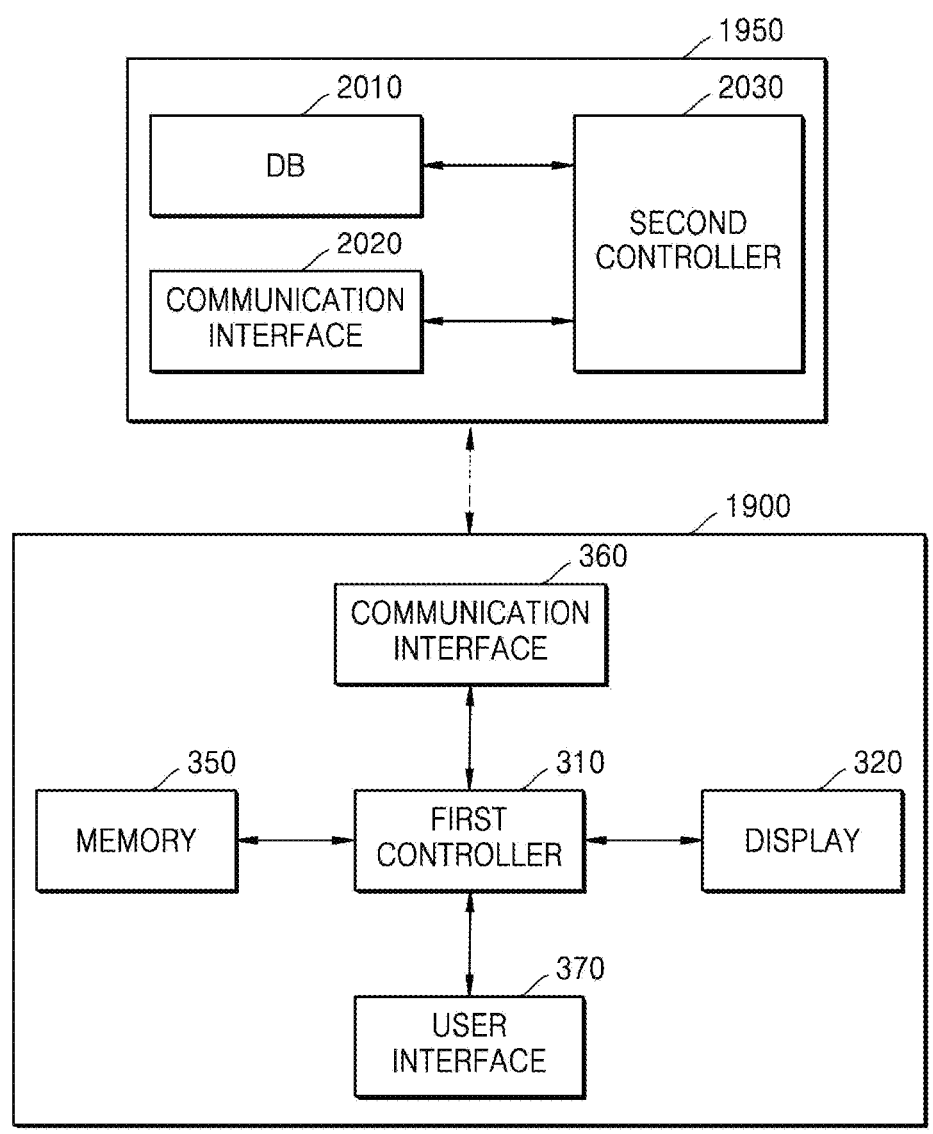
FIG. 20 is a block diagram illustrating a server device that communicates with a display apparatus according to an example embodiment.

FIG. 20 is a block diagram illustrating, in detail, a server device that communicates with a display apparatus according to an example embodiment. Components of FIG. 20 that are the same as the components of FIG. 19 are indicated by the same reference numerals or characters. Thus, a repeated description thereof will be omitted herein. At least one component included in the display apparatus 1900 may be at least one component included in the display apparatus 500 of FIG. 5.

Referring to FIG. 20, the server 1950 according to an embodiment may include a database (DB) 2010, a communication interface 2020, and a controller 2030. The server 1950 may operate in connection with the display apparatus according to an example embodiment, and may perform at least one of input data analysis, object recognition, object classification, and result data output by performing a calculation according to the neural network.

The DB 2010 may include a memory (not shown), and the server 1950 may store, in the memory, at least one of at least one instruction, program, or data required to perform a certain operation.

The DB 2010 may store pieces of data required by the server 1950 to perform the calculation according to the neural network. For example, the DB 2010 may store an AI model corresponding to a DNN.

The communication interface 2020 may include at least one component that enables communication with the display apparatus 1900. A detailed configuration of the communication interface 2020 is the same as that of the communication interface 360 of FIG. 5, and thus a detailed description thereof will be omitted.

The controller 2030 controls all operations of the server 1950. For example, the controller 2030 may control the DB 2010 and the communication interface 2020 by executing the programs stored in the DB 2010 of the server 1950. The controller 2030 may drive the DNN by executing the program stored in the DB 2010.

The controller 2030 may perform training of the AI model, output of a result of the AI model, an operation necessary for transmitting the result output by the AI model to the display apparatus 1900, or an operation necessary for data transmission/reception with the display apparatus 1900.

In FIG. 20, the controller 310 included in the display apparatus 1900 is illustrated as a first controller, and the controller 2030 included in the server 1950 is illustrated as a second controller.

According to an example embodiment, when the input data is identified as not corresponding to the security data, the processor 301 included in the controller 310 may control a communication interface so that the input data is transmitted to an external device, for example, the server 1950, so that the entire DNN is driven within the external device. For example, when the input data is identified as not corresponding to the security data, the processor 301 included in the controller 310 may control the communication interface 360 to transmit the input data to the communication interface 2020 of the server 1950 so that the entire DNN is driven within the serve 1950. Therefore, the server 1950 may receive the input data, and may input the received input data to the DNN so that the received input data is processed, thereby obtaining output data. The server 1950 may transmit the output data to the display apparatus 1900. Accordingly, the processor 301 included in the controller 310 may obtain output data corresponding to the input data via the communication interface 360.

In general, a high-performance processor may be required in order to perform an operation corresponding to a DNN, because a calculation according to the DNN has a large amount of data calculation. Accordingly, when there is no need for security, output data corresponding to input data may be quickly and easily obtained by transmitting the input data to the external server 1950 having a large memory capacity and including a processor with a guaranteed high performance and processing the input data.

An operation method of a display apparatus according to an example embodiment may be embodied as program commands executable by various computer means and may be recorded on a non-transitory computer-readable recording medium. An example embodiment may include a non-transitory computer readable recording medium having embodied thereon at least one program including instructions which perform the operation method of the display apparatus, according to an example embodiment.

Each embodiment herein may be used in combination with any other embodiment(s) described herein.

The non-transitory computer-readable recording medium may include program commands, data files, data structures, and the like separately or in combinations. The program commands to be recorded on the non-transitory computer-readable recording medium may be specially designed and configured for the disclosure or may be well-known to and usable by one of ordinary skill in the art of computer software. Examples of the non-transitory computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

A machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory storage medium may include a buffer in which data is temporarily stored.

According to an example embodiment, a method according to various disclosed embodiments may be provided by being included in a computer program product. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store (e.g., Play Store™) or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A display apparatus comprising:
   a display;
   at least one processor configured to execute one or more instructions to separately run a normal operating system (OS) and a secure OS, which respectively are to operate in a normal world (NWD) and a secure world (SWD) corresponding to a TrustZone,
   wherein the processor is configured to:
   identify whether input data, input to a deep neural network (DNN) including a plurality of hidden layers between at least an input layer and an output layer, corresponds to and/or comprises security data;
   based on a determination that the input data corresponds to and/or comprises security data, control the secure OS so that layers from the input layer of the DNN to at least one hidden layer connected to the input layer are to be driven within the SWD; and
   based on a determination that the input data does not correspond to and/or comprise security data, control the normal OS so that the entire DNN is to be driven in a world other than the SWD.

2. The display apparatus of claim 1, wherein, based on the input data corresponding to at least one of user input data, content protection data, or personal information of a user, the processor is further configured to identify that the input data corresponds to the security data.

3. The display apparatus of claim 1, wherein, based on the input data being identified as corresponding to and/or comprising security data, the processor is further configured to differently set a depth of the at least one hidden layer driven in the SWD, based on at least one of the type or characteristics of the input data.

4. The display apparatus of claim 1, wherein, based on the input data being identified as corresponding to and/or comprising security data, the processor is further configured to differently set a depth of the at least one hidden layer, based on a security level that is applied to the input data.

5. The display apparatus of claim 4, wherein the processor is further configured to:
   based on first input data to which digital rights management (DRM) encryption has not been applied and second input data to which DRM encryption has been applied corresponding to a first security level and a second security level, respectively:
   control the depth of the at least one hidden layer driven in the SWD to be a first depth, in the DNN receiving the first input data to which DRM encryption has not been applied, and
   control the depth of the at least one hidden layer driven in the SWD to be a second depth higher than the first depth, in the DNN receiving the second input data to which DRM encryption has been applied.

6. The display apparatus of claim 1, wherein the DNN is formed as at least part of a convolution neural network (CNN) including a plurality of hidden layers, and
   the at least one processor is further configured to:
   based on identifying that the input data corresponds to and/or comprises security data, control the secure OS so that layers from the input layer to at least one hidden layer connected to the input layer from among the plurality of hidden layers included in the CNN are to be driven within the SWD; and
   control a calculation corresponding to one hidden layer performing a convolution operation for obtaining a feature map to be performed in the SWD at least once.

7. The display apparatus of claim 1, wherein the processor is further configured to set the depth of the at least one hidden layer driven in the SWD, based on a deformation degree between each of a plurality of intermediate products respectively output by the plurality of hidden layers and the input data.

8. The display apparatus of claim 1, wherein the processor is further configured to set the depth of the at least one hidden layer driven in the SWD, based on a deformation degree increase rate between a plurality of intermediate products respectively output by the plurality of hidden layers.

9. The display apparatus of claim 1, wherein the processor is further configured to train the DNN so that a deformation degree between an intermediate product output by the at least one hidden layer driven in the SWD and the input data increases.

10. The display apparatus of claim 1, wherein, based on identifying that the input data corresponds to and/or comprises the security data, the processor is further configured to control the normal OS so that layers from a subsequent hidden layer subsequently connected to the at least one hidden layer of the DNN to the output layer are driven within the NWD.

11. The display apparatus of claim 1, wherein, based on identifying that the input data does not correspond to and/or comprise security data, the processor is further configured to control the normal OS so that the entire DNN is driven in the NWD.

12. The display apparatus of claim 1, further comprising a communication interface, comprising communication circuitry, configured to communicate with an external device,
wherein, based on identifying that the input data does not correspond to and/or comprise security data, the processor is further configured to control the communication interface so that the input data is to be transmitted to the external device so that the entire DNN is to be driven in the NWD.

13. An operation method of a display apparatus comprising at least one processor configured to separately run a normal operating system (OS) and a secure OS, which are respectively executed in a normal world (NWD) and a secure world (SWD) corresponding to and/or related to a trustzone, the operation method comprising:
identifying whether input data input to a deep neural network (DNN) including a plurality of hidden layers between an input layer and an output layer corresponds to and/or comprises security data;
based on identifying that the input data corresponds to and/or comprises security data, controlling the secure OS so that layers from the input layer to at least one hidden layer connected to the input layer from among the plurality of hidden layers included in the DNN are driven within the SWD; and
based on identifying that the input data does not correspond to and/or comprise security data, controlling the normal OS so that the entire DNN is driven in a world other than the SWD.

14. The operation method of claim 13, wherein the identifying comprises, based on the input data corresponding to at least one of user input data, content protection data, or personal information of a user, identifying that the input data corresponds to and/or comprises the security data.

15. The operation method of claim 13, further comprising, based on the input data being identified as corresponding to and/or comprising security data, differently setting a depth of the at least one hidden layer driven in the SWD, based on at least one of the type or characteristics of the input data.

16. The operation method of claim 13, further comprising, based on the input data being identified as corresponding to and/or comprising security data, differently setting a depth of the at least one hidden layer, based on a security level that is applied to the input data.

17. The operation method of claim 16, further comprising:
based on first input data to which digital rights management (DRM) encryption has not been applied and second input data to which DRM encryption has been applied corresponding to a first security level and a second security level, respectively,
setting the depth of the at least one hidden layer driven in the SWD to be a first depth, in the DNN receiving the first input data to which DRM encryption has not been applied, and
setting the depth of the at least one hidden layer driven in the SWD to be a second depth higher than the first depth, in the DNN receiving the second input data to which DRM encryption has been applied.

18. The operation method of claim 13, further comprising setting the depth of the at least one hidden layer driven in the SWD, based on a deformation degree between each of a plurality of intermediate products respectively output by the plurality of hidden layers and the input data.

19. A non-transitory computer-readable recording medium having recorded thereon a computer program which, when executed by at least one processor, causes the at least one processor to execute a method for operating a display apparatus comprising the at least one processor configured to separately run a normal operating system (OS) and a secure OS, which are respectively executed in a normal world (NWD) and a secure world (SWD) corresponding to and/or related to a trustzone, the method comprising:
identifying whether input data input to a deep neural network (DNN) including a plurality of hidden layers between an input layer and an output layer corresponds to and/or comprises security data;
based on identifying that the input data corresponds to and/or comprises security data, controlling the secure OS so that layers from the input layer to at least one hidden layer connected to the input layer from among the plurality of hidden layers included in the DNN are driven within the SWD; and
based on identifying that the input data does not correspond to and/or comprise security data, controlling the normal OS so that the entire DNN is driven in a world other than the SWD.

* * * * *